(12) United States Patent
Zhou et al.

(10) Patent No.: US 9,591,524 B2
(45) Date of Patent: Mar. 7, 2017

(54) METHOD AND APPARATUS FOR TRANSMITTING DATA IN NETWORK SYSTEM, AND DATA TRANSMISSION SYSTEM

(71) Applicant: Tencent Technology (Shenzhen) Company Limited, Shenzhen (CN)

(72) Inventors: Feihu Zhou, Shenzhen (CN); Ming Rao, Shenzhen (CN); Liqiang Xie, Shenzhen (CN); Yingpai Song, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 15/182,445

(22) Filed: Jun. 14, 2016

(65) Prior Publication Data

US 2016/0295457 A1 Oct. 6, 2016

Related U.S. Application Data

(63) Continuation of application No. PCT/CN2014/092424, filed on Nov. 28, 2014.

(30) Foreign Application Priority Data

Dec. 16, 2013 (CN) .......................... 2013 1 0689457

(51) Int. Cl.
*H04L 12/26* (2006.01)
*H04L 12/56* (2006.01)
(Continued)

(52) U.S. Cl.
CPC ......... *H04W 28/065* (2013.01); *H04L 65/605* (2013.01); *H04L 67/06* (2013.01);
(Continued)

(58) Field of Classification Search
CPC ............. H04W 28/065; H04W 76/021; H04W 76/022; H04L 67/2842; H04L 65/605;
(Continued)

(56) References Cited

U.S. PATENT DOCUMENTS

| 2010/0103837 A1* | 4/2010 | Jungck | H04L 29/12066 370/252 |
| 2013/0132580 A1* | 5/2013 | Rothschild | H04L 67/06 709/226 |
| 2013/0346483 A1* | 12/2013 | Alstad | H04L 69/04 709/203 |

FOREIGN PATENT DOCUMENTS

| CN | 1595905 A | 3/2005 |
| CN | 102368767 A | 3/2012 |

(Continued)

OTHER PUBLICATIONS

Tencent Technology, ISRWO, PCT/CN2014/092424, Mar. 4, 2015, 7 pgs.

*Primary Examiner* — Kiet Tang
(74) *Attorney, Agent, or Firm* — Morgan, Lewis & Bockius LLP

(57) ABSTRACT

A method is disclosed, comprising receiving a first connection request from a device, and in response to receiving the first connection request from the device, connecting to and sending a first confirmation message to the device. The method includes receiving a set of one or more packet fragments from the device, buffering the set of packet fragments, and sending a packet-receipt confirmation to the device. The method includes sending a second connection request to a central node server and receiving a second confirmation message from the central node server. The method includes, in response to receiving the second confirmation message, combining the set of packet fragments into one or more data packets, sending the combined data (Continued)

packets to the central node server, and receiving a second packet-receipt confirmation from the central node server, and in response to the second packet-receipt confirmation, deleting the first set of buffered packet fragments.

20 Claims, 23 Drawing Sheets

(51) Int. Cl.
| | | |
|---|---|---|
| *G06F 15/173* | (2006.01) | |
| *G06F 15/16* | (2006.01) | |
| *H04W 28/06* | (2009.01) | |
| *H04L 29/08* | (2006.01) | |
| *H04N 21/2225* | (2011.01) | |
| *H04N 21/239* | (2011.01) | |
| *H04L 29/06* | (2006.01) | |
| *H04L 12/801* | (2013.01) | |
| *H04W 76/02* | (2009.01) | |
| *H04L 1/16* | (2006.01) | |

(52) U.S. Cl.
CPC ...... *H04L 67/2842* (2013.01); *H04L 67/2857* (2013.01); *H04N 21/2225* (2013.01); *H04N 21/2393* (2013.01); *H04W 76/021* (2013.01); *H04L 1/16* (2013.01); *H04L 47/34* (2013.01); *H04L 65/4069* (2013.01); *H04W 76/022* (2013.01)

(58) Field of Classification Search
CPC . H04L 67/06; H04L 67/2857; H04L 65/4069; H04L 1/16; H04L 47/34; H04N 21/2393; H04N 21/2225
See application file for complete search history.

(56) References Cited

FOREIGN PATENT DOCUMENTS

| | | |
|---|---|---|
| CN | 102440028 A | 5/2012 |
| CN | 103023768 A | 4/2013 |
| WO | WO 2013038155 A1 | 3/2013 |

* cited by examiner

2000

- 2002: Receive a first connection-establishment request from a first portable electronic device, wherein the first connection-establishment request comprises a unique identification number corresponding to the first portable electronic device and is generated by a client-side of an application running on the first portable electronic device
  - 2004: The first portable electronic device is assigned to the acceleration node by a central node server, in accordance with an acceleration node query request from the first portable electronic device
  - 2006: The central node server and the acceleration node are located in different countries

- 2008: In response to receiving the first connection-establishment request from the first portable electronic device:
  - 2010: Connect to the first portable electronic device
  - 2012: Send a first connection-confirmation message to the first portable electronic device

- 2014: Receive a first set of one or more packet fragments from the first portable electronic device
  - 2016: The one or more packet fragments of the first set are each of a predetermined fragment size and each comprise a parent packet identifier to associate multiple packet fragments together
  - 2018: One packet fragment of the first set is a complete packet

FIG. 20A

METHOD AND APPARATUS FOR TRANSMITTING DATA IN NETWORK SYSTEM, AND DATA TRANSMISSION SYSTEM

RELATED APPLICATION

This application is a continuation application of PCT Patent Application No. PCT/CN2014/092424, entitled "METHOD AND APPARATUS FOR TRANSMITTING DATA IN NETWORK SYSTEM, AND DATA TRANSMISSION SYSTEM" filed on Nov. 28, 2014, which claims priority to Chinese Patent Application No. 201310689457.3, "METHOD AND APPARATUS FOR TRANSMITTING DATA IN NETWORK SYSTEM, AND DATA TRANSMISSION SYSTEM," filed on Dec. 16, 2013, both of which are hereby incorporated by reference in their entirety.

TECHNICAL FIELD

The present disclosure relates to the field of data transmission technologies, and more particularly to a method and an apparatus for transmitting data in a network system, and a data transmission system.

BACKGROUND

An objective of a content delivery network (CDN) is to distribute, by adding a layer of new network architecture in the existing Internet, popular resources or resources that a user needs to an edge node nearest to the user, so that the user can obtain needed content nearby, a situation of network congestion of the Internet can be solved, and a response speed of assessing resources by the user can be improved.

For static resources such as news that generally is not altered any more once published, already released TV programs, movies, and novels, a CDN technology is essentially a desirable solution to adopt. However, for dynamic resources that are generally generated by a user and keep changing with time and places, it is impossible to update all resources to an edge node nearest to the user at once. Therefore, the user cannot obtain accelerated access to the dynamic resources by using an existing CDN architecture.

Therefore, it is necessary to provide a new data transmission manner, so as to accelerate network access to dynamic resources for a user.

SUMMARY

The above deficiencies and other problems associated with accelerating network access to dynamic resources for a user are addressed by the techniques disclosed herein. In some embodiments, the method for accelerating network access to dynamic resources for a user is implemented on a computer system that has one or more processors, memory and one or more modules, programs or sets of instructions stored in the memory for performing multiple functions. Instructions for performing these functions may be included in a computer program product configured for execution by one or more processors.

In one aspect, a computer-implemented method for transmitting and receiving data at an acceleration node, includes receiving a first connection-establishment request from a first portable electronic device, wherein the first connection-establishment request comprises a unique identification number corresponding to the first portable electronic device and is generated by a client-side of an application running on the first portable electronic device. The method includes, in response to receiving the first connection-establishment request from the first device, connecting to the first device and sending a first connection-confirmation message to the first device. The method includes receiving a first set of one or more packet fragments from the first portable electronic device, and in accordance with a determination that the first set of one or more packet fragments satisfies one or more buffering criteria, buffering the first set of one or more packet fragments, and sending a first packet-receipt confirmation to the first portable electronic device, the first packet-receipt confirmation indicating that the first set of one or more packet fragments has been received by a central node server that runs a server-side of the application, wherein the first portable electronic device is configured to perform another task unrelated to the first set of one or more packet fragments upon receipt of the first packet-receipt confirmation. The method includes sending a second connection-establishment request to the central node server and receiving a second connection-confirmation message from the central node server. The method includes, in response to receiving the second connection-confirmation message from the central node server, combining the set of one or more packet fragments into one or more data packets, sending the combined data packets to the central node server, and receiving a second packet-receipt confirmation from the central node server. The method includes, in response to receiving the second packet-receipt confirmation, deleting the first set of one or more buffered packet fragments from the acceleration node.

In another aspect, a server for transmitting and receiving data at an acceleration node includes memory, one or more processors, and one or more programs stored in the memory and configured for execution by the one or more processors to perform the method described herein.

In another aspect, a non-transitory computer readable storage medium stores one or more programs, the one or more programs comprising instructions, which when executed by a server, cause the server to perform the method described herein.

Various advantages of the disclosed technology would be apparent in light of the descriptions below.

BRIEF DESCRIPTION OF THE DRAWINGS

The aforementioned features and advantages of the disclosure as well as additional features and advantages thereof will be more clearly understood hereinafter as a result of a detailed description of preferred embodiments when taken in conjunction with the drawings.

FIGS. 20A-20D are a flow chart of a method or transmitting and receiving data at an acceleration node, in accordance with some embodiments.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

To further elaborate technical means used in the present disclosure to achieve a predetermined inventive objective, and an effect of the technical means, the following describes in detail specific embodiments, structures, features, and their effects based on the present disclosure with reference to the accompanying drawings and preferred embodiments.

Figure 1:
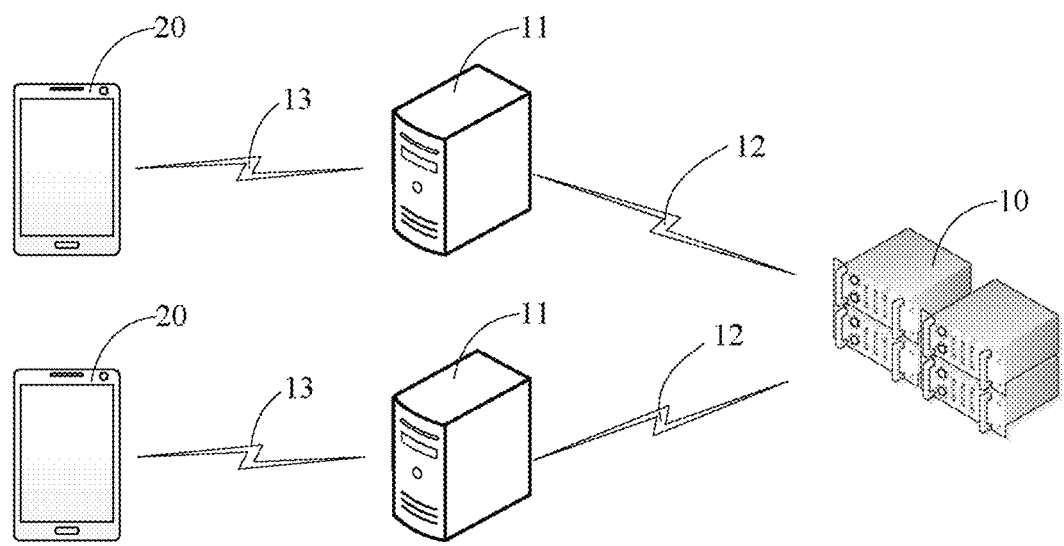
FIG. 1 is a schematic diagram of an architecture of a data transmission system according to a first embodiment.

FIG. 1 is a schematic diagram of an architecture of a data transmission system according to a first embodiment. As shown in FIG. 1, the data transmission system 100 includes: one or more (only one is shown in FIG. 1) central nodes 10, and one or more (four are shown in FIG. 1) acceleration nodes 11. The central node 10, for example, may be a data center which includes multiple servers used to provide different services separately or to provide a same service by using a distributed architecture.

Multiple acceleration nodes 11 may be deployed separately in different geographic areas, for example, one acceleration node 11 may be disposed in each country, district, or city. The acceleration node 11 may also include one or more acceleration servers. The central node 10 and the acceleration node 11 are connected through a network 12. The network 12 may be a high speed Internet connection such as a fiber network or a satellite communication network.

A mobile terminal 20 may be connected to the acceleration node 11 through a network 13. The network 13, for example, may be a mobile communications network or a wireless local area network.

Figure 2:
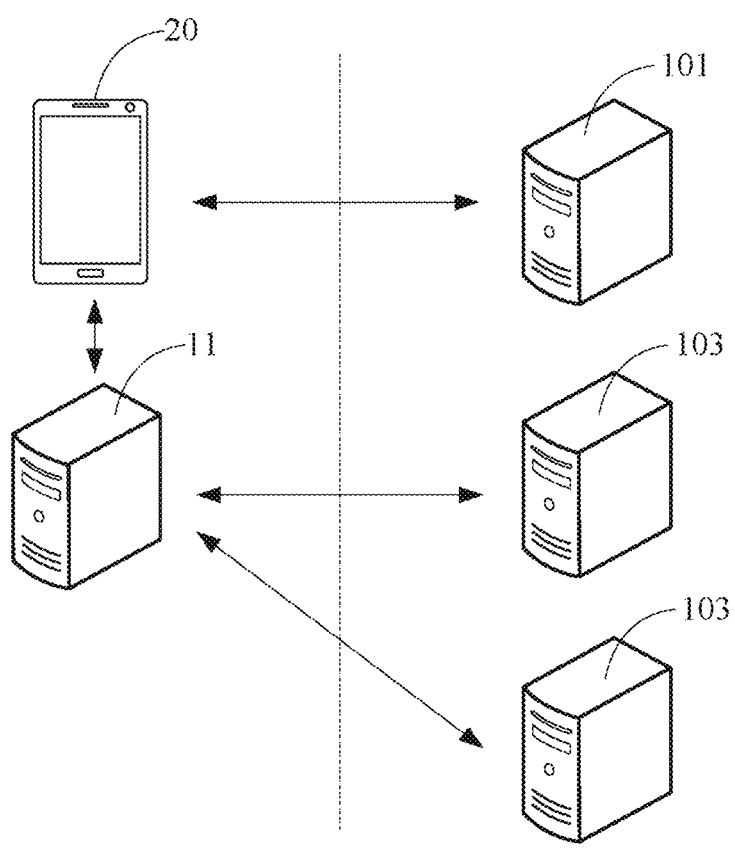
FIG. 2 is another schematic diagram of the data transmission system in FIG. 1.

Referring to FIG. 2, the central node 10 may include one or more (only one is shown in FIG. 1) acceleration node query servers 101, and one or more (only two are shown in FIG. 1) application servers 103. Here, the acceleration node query server 101 is used to receive an acceleration node query request sent by a client (for example, the mobile terminal 20 shown in FIG. 1), and return an acceleration node 11 nearest to a current geographic location of the mobile terminal 20. The application server 103 is used to provide a network service, receive data sent by the client (for example, the mobile terminal 20 or the acceleration node 11 shown in FIG. 1), and send other data to the client.

Figure 3:
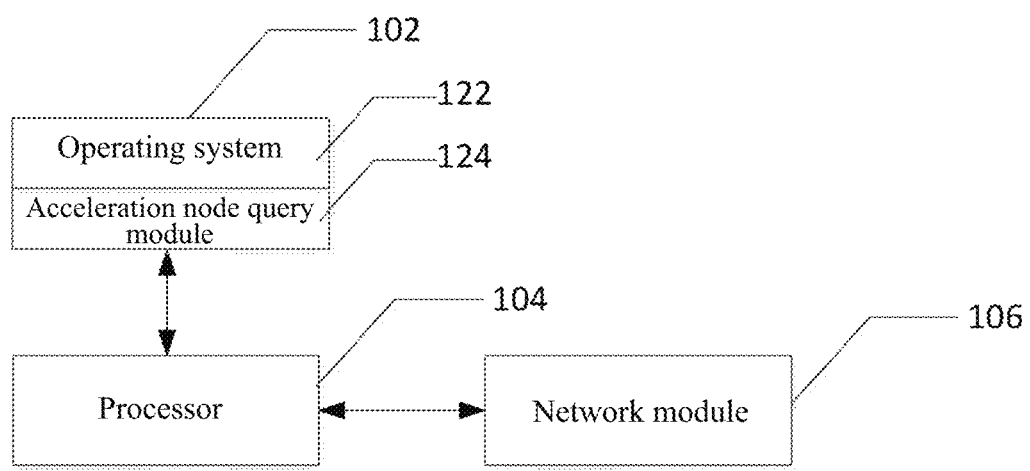
FIG. 3 is a structural block diagram of an acceleration node query server in a central node of the data transmission system in FIG. 1.

FIG. 3 is a structural block diagram of an embodiment of the foregoing acceleration node query server 101. As shown in FIG. 3, the acceleration node query server 101 includes: a memory 102, a processor 104, and a network module 106. It can be understood that the structure shown in FIG. 3 is only exemplary, which does not limit the structure of the acceleration node query server 101. For example, the acceleration node query server 101 may further include more or less components than those shown in FIG. 3, or has a different configuration from that shown in FIG. 3.

The memory 102 may be used to store a software program and a module. The processor 104 runs the software program and module stored in the memory 102, thereby executing various function applications and data processing. The memory 102 may include a high speed random access memory, and may further include a non-volatile memory, for example, one or more magnetic storage apparatuses, flash memories, or other non-volatile solid-state memories. In some examples, the memory 102 may further include memories disposed remotely from the processor 104. The remote memories may be connected to the acceleration node query server 101 through a network. Examples of the foregoing network include, but are not limited to, the Internet, an enterprise intranet, a local area network, a mobile communications network, and a combination of them.

A transmission module 106 is used to receive and send a network signal. The network signal may include a wireless signal or a wired signal. In an example, the network signal is a wired network signal. In this case, the transmission module 106 may include components such as a processor, a random access memory, a converter or a crystal oscillator.

The foregoing software program and module include: an operating system 122 and an acceleration node query module 124. The operating system 122, for example, may be LINUX, UNIX, or WINDOWS, which may include various software components and/or drivers used for system task management (such as memory management, storage device control, or power supply management). In addition, the operating system 122 may communicate with various hardware or software components, thereby providing a running environment for other software components. The acceleration node query module 124 runs based on the operating system 122, listens to a request from the network by using a network service of the operating system 122, completes corresponding data processing according to the request, and returns a processing result to a client. In other words, the acceleration node query module 124 is used to receive an acceleration node query request sent by a client (for example, the mobile terminal 20 shown in FIG. 1) and return an acceleration node 11 nearest to a current geographic location of the mobile terminal 20.

Figure 4:
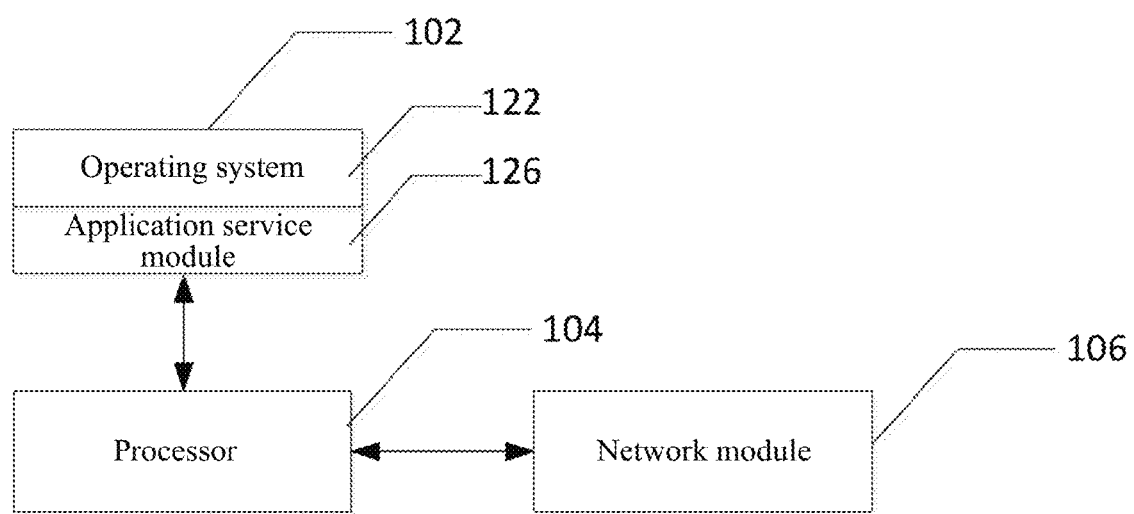
FIG. 4 is a structural block diagram of an application server in a central node of the data transmission system in FIG. 1.

FIG. 4 is a structural block diagram of an embodiment of the foregoing application server 103. Comparing FIG. 3 with FIG. 4, a hardware structure of the application server 103 is similar to that of the acceleration node query server 101, and a difference lies in that the memory 102 includes an application service module 126. The application service module 126 listens to a request from a network by using a network service of an operating system 122, completes corresponding data processing according to the request, and returns a processing result to a client. Specifically, the application service module 126, for example, may provide an instant messaging service used to send/actively push content such as text, voice, or video input by a user to a designated receiver.

Figure 5:
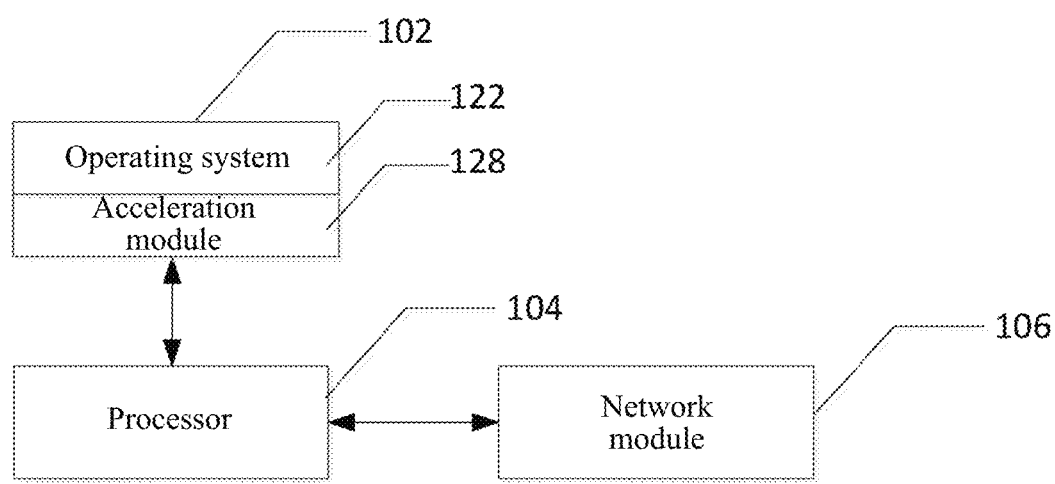
FIG. 5 is a structural block diagram of an acceleration server in an acceleration node of the data transmission system in FIG. 1.

FIG. 5 is a structural block diagram of an embodiment of an acceleration server in the foregoing acceleration node 11. Comparing FIG. 3 with FIG. 5, a hardware structure of the application server 103 is similar to that of the acceleration node query server 101, and a difference lies in that the memory 102 includes an acceleration module 128. The acceleration module 128 listens to a request from a network by using a network service of an operating system 122, completes corresponding data processing according to the request, and returns a processing result to a client. Specifically, the acceleration module 128 may receive data sent by the mobile terminal 20, forward the data to the application server 103, and forward received data sent by the application server 103 to a corresponding mobile terminal 20. Moreover, after forwarding the data, the acceleration module 128 may further be simulated as the mobile terminal 20/application server 103 to send response information to the application server 103/mobile terminal 20, respectively.

Figure 6:
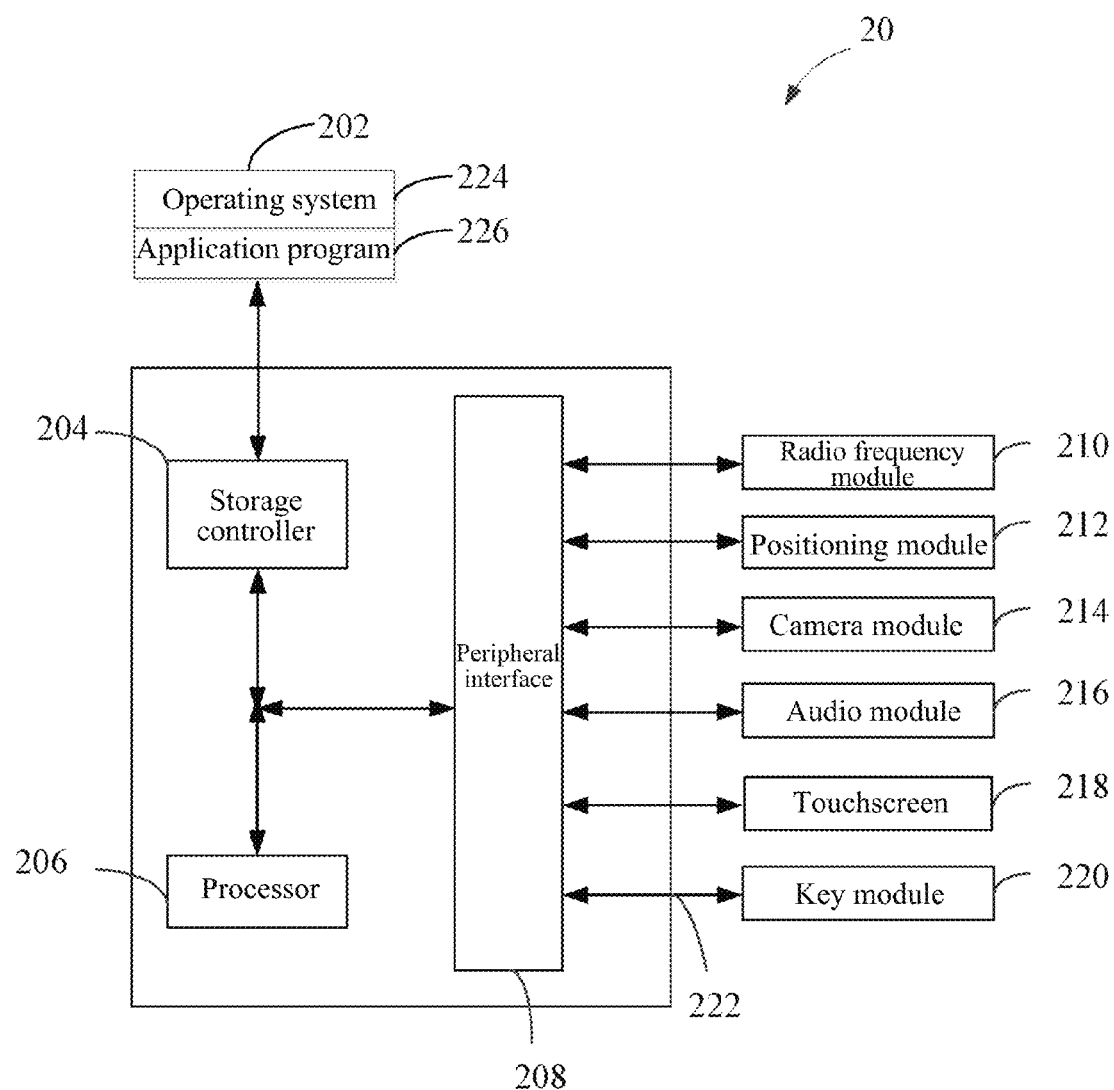
FIG. 6 is a structural block diagram of a mobile terminal shown in FIG. 1.

FIG. 6 is a structural block diagram of an embodiment of the foregoing mobile terminal 20. As shown in FIG. 6, the mobile terminal 20 includes a memory 202, a storage controller 204, one or more (only one is shown in FIG. 6) processors 206, a peripheral interface 208, a radio frequency module 210, a positioning module 212, a camera module 214, an audio module 216, a touchscreen 218, and a key module 220. These components communicate with each other through one or more communications buses/signal cables 222.

It can be understood that the structure shown in FIG. 6 is only exemplary, and the mobile terminal 20 may further include more or less components than those shown in FIG. 6, or has a configuration different from that shown in FIG. 6. The components shown in FIG. 6 may be executed by using hardware, software, or a combination of the hardware and the software.

The memory 202 may be used to store a software program and module. The processor 206 runs the software program and module stored in the memory 202, thereby executing various function applications and data processing. The memory 202 may include a high speed random access memory, and may also include a non-volatile memory such as one or more magnetic storage apparatuses, flash memories, or other non-volatile solid-state memories. In some examples, the memory 202 may further include memories disposed remotely from the processor 206. The remote memories may be connected to the mobile terminal 20 through a network. Examples of the foregoing network include, but are not limited to, the Internet, an enterprise intranet, a local area network, a mobile communications network, and a combination of them. Access to the memory 202 by the processor 206 and other possible components may be performed under the control of the storage controller 204.

A person of ordinary skill in the art may understand that in contrast with the processor 206, all other components are peripherals, and the processor 206 is coupled to these peripherals through multiple peripheral interfaces 208. The peripheral interface 208 may be implemented based on the following standards: a universal asynchronous receiver/transmitter (UART), a general purpose input/output (GPIO), a serial peripheral interface (SPI), and an inter-integrated circuit (I2C), but is not limited to the foregoing standards. In some examples, the peripheral interface 208 may only include a bus. In some other examples, the peripheral interface 208 may further include other components such as one or more controllers, for example, a display controller to be connected to a liquid crystal display panel or a storage controller to be connected to a memory. Moreover, the controller may further be separated from the peripheral interface 208 and is instead integrated into the processor 206 or a corresponding peripheral. In other words, the peripheral interface 208, the processor 206, and the storage controller 204 may be implemented in a single chip in some embodiments, and may be separately implemented by independent chips in some other examples.

The radio frequency module 210 is used to receive and send an electromagnetic wave, and perform mutual conversion between the electromagnetic wave and an electrical signal to perform communication with a communication network or other devices. The radio frequency module 210 may include various conventional circuit components used to execute the functions, such as an antenna, a radio frequency transceiver, a digital signal processor, an encryption/decryption chip, a subscriber identity module (SIM) card or a memory. The radio frequency module 210 may communicate with various networks such as the Internet, an enterprise intranet, and a wireless network, or communicate with other devices through the wireless network. The foregoing wireless network may include a cellular phone network, a wireless local area network or a metropolitan area network. The foregoing wireless network may use various communications standards, protocols, and technologies, which include, but are not limited to, a Global System for Mobile Communications (GSM), Enhanced Data rates for GSM Evolution (EDGE), Wideband Code Division Multiple Access (W-CDMA), Code Division Multiple Access (CDMA), Time Division Multiple Access (TDMA), Bluetooth, Wireless Fidelity (WiFi) (for example, the standards of the Institute of Electrical and Electronics Engineers IEEE 802.11a, IEEE 802.11b, IEEE802.11g and/or IEEE 802.11n), Voice over Internet Protocol (VoIP), Worldwide Interoperability for Microwave Access (Wi-Max), other protocols used for emails, instant messaging, and short messages, and any other proper communication protocols, and even include those protocols to be developed in the future).

The positioning module 212 is used to obtain a current location of the mobile terminal 20. For example, the positioning module 212 may receive a positioning signal broadcast by a satellite, and calculate a location of the positioning module 212 according to the positioning signal. The foregoing location, for example, may be indicated by a longitude, a latitude, and an altitude. An available satellite positioning system includes the Global Positioning System (GPS), the Compass Navigation Satellite System (CNSS) or the Global Navigation Satellite System (GLONASS). The positioning module 212 is not limited to using a satellite positioning technology, for example, may also use a wireless positioning technology, such as a positioning technology based on a wireless base station or a positioning technology based on a wireless hotspot. In this case, the positioning module 212 may be replaced by a corresponding module, or is directly implemented by the processor 206 executing a specific positioning program.

The camera module 214 is used to take a photo or a video. The photo or video taken may be stored in the memory 202, and may be sent by using the radio frequency module 210. The camera module 214 specifically may include components such as a lens module, an image sensor, and a flash. The lens module is used to form an image of a photographed target, and project the formed image into the image sensor. The image sensor is used to receive light rays from the lens module and implement light sensing, so as to record image information. Specifically, the image sensor may be implemented based on a complementary metal oxide semiconductor (CMOS), a charge-coupled device (CCD) or other image sensing principles. The flash is used to perform exposure compensation during photographing. Generally, a flash used in the mobile terminal 20 may be a light emitting diode (LED) flash.

The audio module 216 provides an audio interface for a user, which may include one or more microphones, one or more speakers, and an audio circuit. The audio circuit receives audio data at the peripheral interface 208, converts the audio data into electrical information, and transmits the electrical information to the speaker. The speaker converts the electrical information into a sound wave perceivable by human ears. The audio circuit also receives electrical information from the microphone, converts the electrical information into audio data, and transmits the audio data to the peripheral interface 208 for further processing. The audio data may be obtained from the memory 202 or by using the radio frequency module 210. Moreover, the audio data may also be stored in the memory 202 or sent by using the radio frequency module 210. In some examples, the audio module 216 may further include an earphone jack used to provide an audio interface for an earphone or another device.

The touchscreen 218 simultaneously provides an output interface and an input interface between the mobile terminal 20 and a user. Specifically, the touchscreen 218 displays a video output to the user. Content of the video output may include text, a picture, video, and any combination of them. Some output results correspond to some user interface objects. The touchscreen 218 further receives a user input such as gesture operations including a tap and a slide of the user, so that user interface objects respond to these user inputs. A technology of detecting a user input may be based on a resistive, capacitive, or any other possible touch detection technology. A specific example of a display unit of the touchscreen 218 includes, but is not limited to, a liquid crystal display or a light-emitting polymer display. In some other embodiments, the touchscreen 218 may also be replaced by a display apparatus of another type, including, for example, a projection display apparatus. Compared with an ordinary display panel, the projection display apparatus further needs to include some components for projection, for example, a lens group.

The key module 220 also provides an interface for input by a user to the mobile terminal 20. The user may press different keys to enable the mobile terminal 20 to execute different functions.

A software program and module in the memory 202 may include: an operating system 224 and an application program 226. The operating system 224, for example, may be any operating system suitable for a mobile terminal, such as an Android operating system from Google, an iOS operating system from Apple, and a Windows Mobile operating system from Microsoft. The application program 226 runs based on the operating system 224. In an example, the application program 226 may include one network communication application program used to provide a function of sending text, voice, or video by a user to a contact. It can be understood that the foregoing sending of text, voice, or video needs to be implemented based on a network connection.

Figure 7:
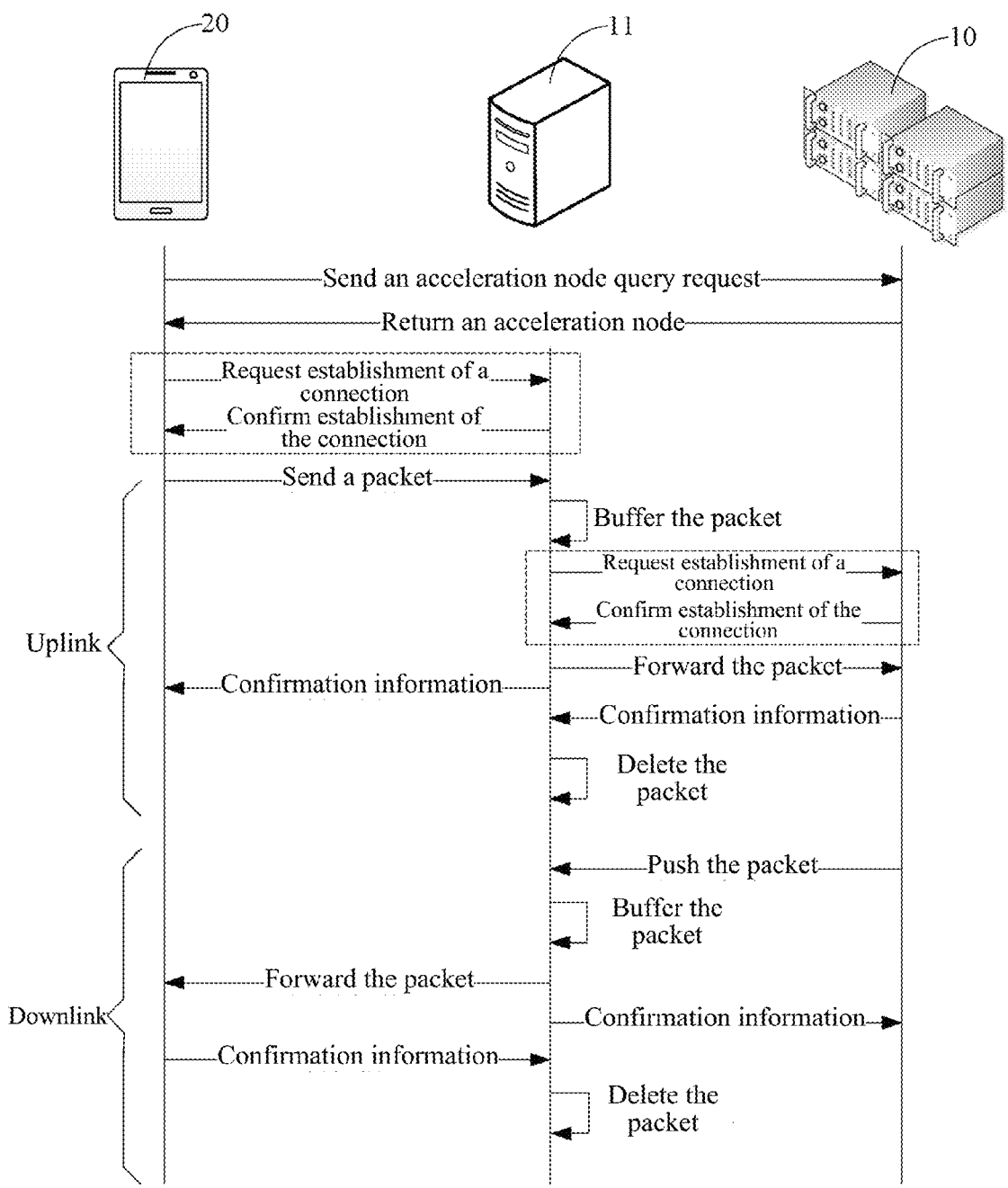
FIG. 7 is a schematic diagram of interactions in the data transmission system in FIG. 1.

FIG. 7 is a schematic diagram of an interaction time sequence of the data transmission systems 100 shown in FIG. 1 during data transmission. As shown in FIG. 7, before actually sending data, the application program 226 in the mobile terminal 20 first sends an acceleration node query request to the central node 10. The acceleration node query request may be based on the Hypertext Transfer Protocol (HTTP), the Domain Name System (DNS) or any other protocols by using which data can be exchanged. Specifically, the acceleration node query request is sent to an acceleration node query server 101.

In an example, after receiving an acceleration node query request sent by the mobile terminal 20, the acceleration node query server 101 parses an IP address included in the acceleration node query request, determines a geographic location of the mobile terminal 20 according to the IP address, obtains an IP address of an acceleration node 11 nearest to the mobile terminal 20, and returns the IP address to the mobile terminal 20.

In another example, the foregoing mobile terminal 20 may determine a geographic location of the mobile terminal 20 by using a positioning module 212 of the mobile terminal 20, and include the foregoing geographic location in the foregoing acceleration node query request. In this way, the acceleration node query server 101 no longer needs to determine a location of the mobile terminal 20 by using an IP address, and instead can directly make a query and return the IP address of the nearest acceleration node 11 according to the geographic location in the acceleration node query request.

After receiving the IP address of the acceleration node 11 returned by the acceleration node query server 101, the mobile terminal 20 may request the acceleration node 11 to establish a network connection. The network connection may be a long network connection, for example, a Transfer Control Protocol (TCP) connection. It can be understood that after the connection is successfully established, all subsequent data transmission can use the already established network connection without needing to reestablish a network connection each time data is sent. Multiple mobile terminals 20 may establish network connections to the acceleration node 11 simultaneously. Therefore, in the acceleration node 11, each established network connection may be associated with a unique Universal Identification Number (UIN) of each mobile terminal 20. In this way, it may be easily found, by using the UINs of the mobile terminals 20, which network connection can be used to send data to a corresponding mobile terminal 20.

When the mobile terminal 20 needs to send data, for example, a user inputs a piece of text or voice in a dialog interface provided by the application program 226 and triggers a sending condition (for example, taps a predetermined button or stops speaking), the application program 226 assembles content to be sent into a packet according to a predetermined protocol, and sends the packet through the established network connection.

A process of assembling the packet by the application program 226 may be as follows: First, it is determined whether the length of data to be sent exceeds a preset threshold. If the length of the data exceeds the preset threshold, the packet needs to be sent fragment by fragment. Otherwise, the data is sent in a single packet. When the data needs to be sent fragment by fragment, the data to be sent is divided into multiple fragments according to a predetermined fragment size, and each fragment is assembled into a fragment packet.

The packet generally may include header information and packet text. The header information may include information of the central node 10 to which the packet is sent, and other control information, for example, whether the packet is a fragment packet. If the packet is a fragment packet, the packet may further include a parent packet identifier used to associate multiple fragment packets. The packet text may include encoded data of the foregoing text or voice.

Correspondingly, the acceleration server in the acceleration node 11 receives the packet. After receiving the packet, the acceleration server may attempt to buffer the packet in a local buffer. The foregoing local buffer, for example, is any possible storage medium such as a cache database (CDB), a memory, a hard disk, or a solid-state memory. Specifically, the packet may be inserted to a queue corresponding to the mobile terminal 20. It can be understood that each packet sent by a specific mobile terminal 20 may have a unique sequence number for use as a unique identifier of the packet. Therefore, in the foregoing local buffer, one queue may be stored corresponding to each mobile terminal 20, where the queue stores all packets sent by the mobile terminal 20 corresponding to the queue, and each packet is identified by using a unique sequence number.

If the packet is buffered in the local buffer successfully, the acceleration server in the acceleration node 11 may forward the packet to the central node 10/application server 103, and may simulate a protocol of the central node 10/application server 103 to respond to the packet. If the packet fails to be buffered in the local buffer, the acceleration server may retry a predetermined number of times. If buffering still fails, the acceleration server may forward the packet to the central node 10/application server 103, but does not simulate a protocol of the central node 10/application server 103 to respond to the packet.

The foregoing forwarding the packet to the central node 10/application server 103 may include:

parsing the central node 10 to which the packet is to be sent; where if information about the central node 10 is not obtained, for example, a field about the central node in header information is empty or invalid, in this case, a default central node 10 may be used; it can be understood that each central node 10 may include multiple application servers 103, and the packet is to be sent to a specific application server 103; therefore, an address of an application server 103 to which the packet is to be sent needs to be determined first.

In an example, the acceleration server in the acceleration node 11 selects, according to a predetermined configuration rule, an application server 103 in a target central node 10 as a target server.

In another embodiment, the central node 10 has one or more route servers used to receive a request of a client (for example, the foregoing acceleration server) and return an allocated target server. The route server may also select a target server according to the foregoing predetermined rule or select an application server 103 with relatively low load according to the load of all application servers 103.

After determining the address of the application server 103 to which the packet is to be sent, the acceleration server requests establishment of a network connection to the application server 103. Correspondingly, the application server 103 confirms establishment of the network connection. The established network connection may be a long network connection, for example, a TCP connection. It can be understood that after the connection is established successfully, the established network connection may always be used for sending data to the application server 103 without needing to reestablish a network connection each time data is to be sent. In the application server 103, the network connection may be associated with the UIN of the mobile terminal 20. If a packet is to be sent to a mobile terminal 20, an UIN of the mobile terminal 20 is used to search for a corresponding network connection, and then the packet is sent through the network connection.

Subsequently, the acceleration server may send, to a selected application server 103 by using the established network connection, the packet sent by the mobile terminal 20.

After forwarding the packet to the selected target server 103, the acceleration server may be simulated as the target server 103 to send response information to the mobile terminal 20. In other words, the acceleration server uses a protocol same as that of the central node 10/application server 103 to respond to the packet directly without waiting for a processing result from the central node 10/application server 103.

For packets of different types, the acceleration server should also send different response information. For example:

If the packet is a fragment packet, the acceleration server determines whether the fragment packet is the last fragment among fragments, if yes, the acceleration server sends response information used to indicate that a complete packet is received, and otherwise, the acceleration server sends fragment response information.

If the packet is not a fragment packet, the acceleration server sends response information used to indicate that a complete packet is received.

If the packet only includes protocol signaling, that is, when the packet is a protocol signaling packet, it is determined whether the protocol signaling packet has been sent by the acceleration server, simulated as the mobile terminal 20, to the central node 10/application server 103. If the protocol signaling packet has been sent, the data processing process in the acceleration node 11 is performed, and otherwise, the packet is directly forwarded to the central node 10/application server 103, or the packet is forwarded to the central node 10/application server 103 and the packet is responded to by simulating the protocol used by the central node 10/application server 103.

The foregoing performing the data processing process in the acceleration node 11 includes:

determining whether the protocol signaling is related to a packet, and if yes, parsing a sequence number of a packet targeted by the protocol signaling from header information of the packet, and then performing different data processing for specific protocol information.

For example, if the protocol signaling is confirmation information about that a packet has been received of the mobile terminal 20, a packet corresponding to the sequence number no longer needs to be stored in the local buffer, and the packet corresponding to the sequence number may be deleted from the local buffer.

If the protocol signaling is that the mobile terminal 20 requests resending of a packet, the packet that is stored in the local buffer and corresponds to the sequence number may be resent to the mobile terminal 20.

The foregoing is an uplink process of a packet, that is, a process in which a packet is sent from the mobile terminal 20 to the central node 10/application server 103. The following describes in detail, with reference to a specific example, a downlink process of a packet, that is, a process in which a packet is sent from the central node 10/application server 103 to the mobile terminal 20.

When needing to send a packet to a mobile terminal 20, the application server 103 may query a corresponding network connection by using a UIN of the mobile terminal 20, and send the packet directly through the network connection. However, as shown in FIG. 7, the network connection is a connection to the acceleration server rather than a direct connection to the mobile terminal 20.

Correspondingly, the acceleration server in the acceleration node 11 receives the packet. After receiving the packet, the acceleration server may attempt to buffer the packet in the local buffer. The foregoing local buffer, for example, is any possible storage medium such as a CDB, a memory, a hard disk or a solid-state memory. Specifically, the packet may be inserted to a queue corresponding to the mobile terminal 20. It can be understood that each packet sent by the application server 103 to the mobile terminal 20 may have a unique sequence number for use as a unique identifier of the packet. Therefore, in the foregoing local buffer, one queue may be stored corresponding to each mobile terminal 20, where the queue stores all packets sent to the mobile terminal 20 corresponding to the queue, and each packet is identified by using a unique sequence number.

If the packet is buffered in the local buffer successfully, the acceleration server in the acceleration node 11 may forward the packet to the mobile terminal 20, and may be simulated as the mobile terminal 20 to respond to the packet. If the packet fails to be buffered in the local buffer, the acceleration server may forward the packet to the mobile terminal 20, but is no longer simulated as the mobile terminal 20 to respond to the packet.

The foregoing forwarding the packet to the mobile terminal 20 may include: finding a corresponding network connection according to the UIN, and sending the packet through the network connection.

After forwarding the packet to the mobile terminal 20, the acceleration server may be simulated as the mobile terminal 20 to send response information to the application server 103 without waiting for a processing result of the mobile terminal 20.

For packets of different types, the acceleration server should also send different response information. For example:

If the packet is a fragment packet, the acceleration server determines whether the fragment packet is the last fragment among fragments, if yes, the acceleration server sends response information used to indicate that a complete packet is received, and otherwise, the acceleration server sends fragment response information.

Alternatively, if the packet is not a fragment packet, the acceleration server sends response information used to indicate that a complete packet is received.

If the packet only includes protocol signaling, it is determined whether the protocol signaling has been sent by the acceleration server, simulated as the application server 103, to the mobile terminal 20. If the protocol signaling has been sent, the data processing process in the acceleration node 11 is performed, and otherwise, the packet is directly forwarded to the mobile terminal 20, or the packet is forwarded to the mobile terminal 20 and the packet is responded to by simulating the mobile terminal 20.

The foregoing performing data processing process in the acceleration node 11 includes:
determining whether the protocol signaling is related to a packet, and if yes, parsing a sequence number of a packet targeted by the protocol signaling from header information of the packet, and then performing different data processing for specific protocol information.

For example, if the protocol signaling is confirmation information about that a packet has been received of the application server 103, a packet corresponding to the sequence number no longer needs to be stored in the local buffer any more, and the packet corresponding to the sequence number may be deleted from the local buffer.

If the protocol signaling is that the application server 103 requests resending of a packet, the packet that is stored in the local buffer and corresponds to the sequence number may be resent to the application server 103.

Figure 8:
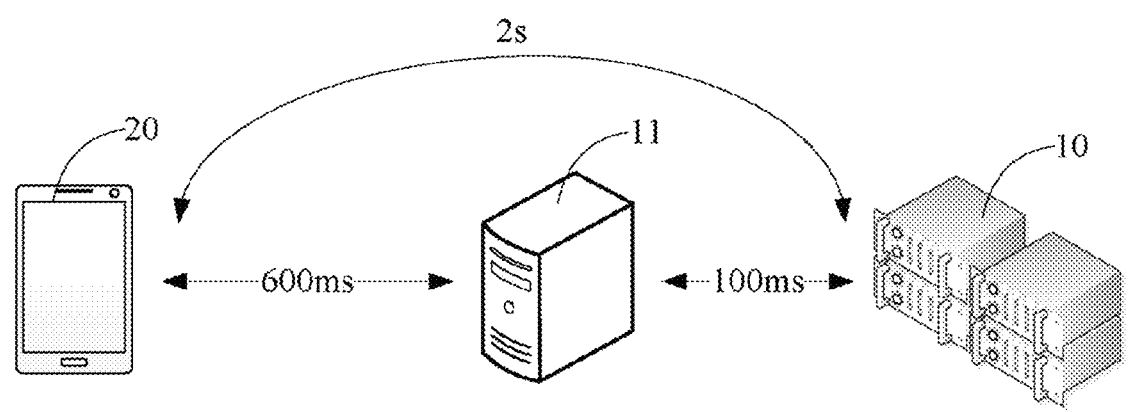
FIG. 8 is a schematic diagram of a network transmission delay of the data transmission system in FIG. 1.

FIG. 8 is a schematic diagram of the duration required by data transmission of a data transmission system 100 in this embodiment. In a typical network environment, a network delay from a mobile terminal 20 directly to a central node 10 is 2 seconds, a network delay from the mobile terminal 20 to an acceleration node 11 is 600 milliseconds, and a network delay from the acceleration node 11 to the central node 10 is 100 milliseconds. Therefore, for the data transmission system 100 according to this embodiment, a network delay may reduce by 1300 milliseconds, thereby greatly reducing impacts of the network delay on communication.

The acceleration server shown in FIG. 5 shows only one acceleration module 128. However, this does not mean that the acceleration module 128 only can be implemented in one server. Functions of the acceleration module may be divided into multiple software modules executed in a same hardware environment, or may be multiple software modules separately executed in different hardware environments, or even may be implemented respectively by using one or more hardware modules such as a field-programmable gate array (FPGA).

Figure 9:
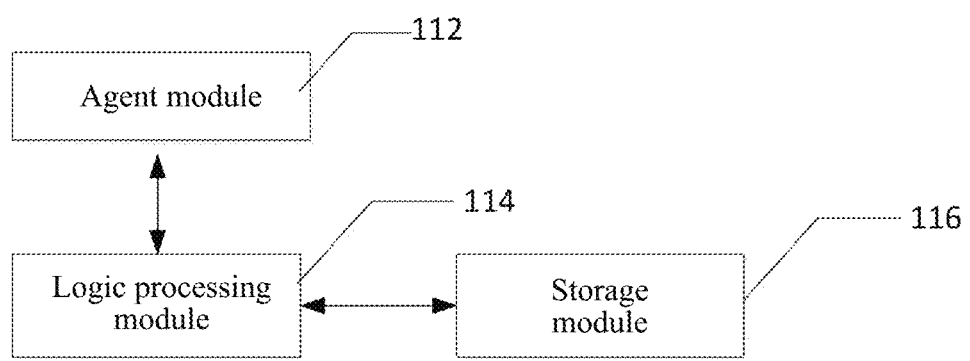
FIG. 9 is another schematic structural diagram of the acceleration node of the data transmission system in FIG. 1.

FIG. 9 is a structural block diagram of an embodiment of the acceleration module 128 shown in FIG. 5. The acceleration module 128 includes: an agent module 112, a logic processing module 114, and a storage module 116. The agent module 112, the logic processing module 114, and the storage module 116 may run on a same server, or may run on different servers separately.

The agent module 112 is used to receive a packet sent by a mobile terminal 20 or an application server 103, perform necessary preprocessing on the packet, forward the preprocessed packet to the logic processing module 114 for logic processing, and forward a received packet to an application server 103 or the mobile terminal 20 under the instruction of the logic processing module 114.

The logic processing module 114 is used to perform logic processing according to the packet forwarded by the agent module 112, submit the packet to the storage module 116 for storage when necessary, and return a processing result to the agent module 112, so that the agent module 112 forwards the packet and sends response information to the mobile terminal 20/application server 103.

The storage module 116 is used to buffer the packet provided by the logic processing module 114, respond to a request of reading or deleting a packet from the logic processing module, and return content of the packet or delete a designated packet.

Figure 10:
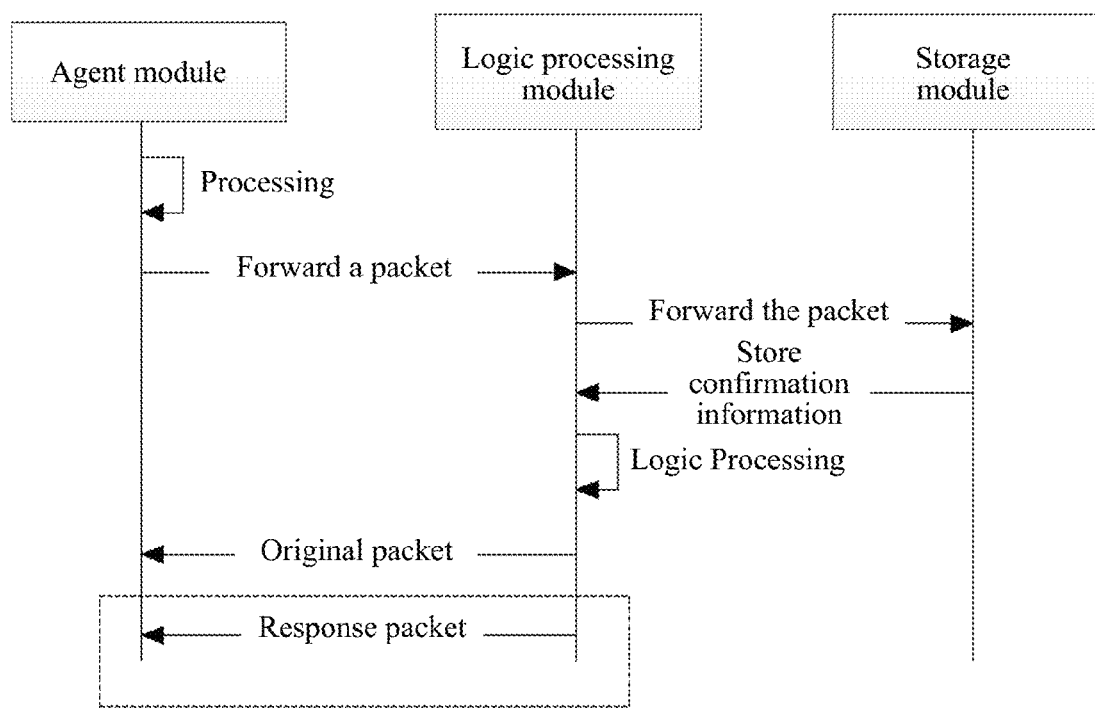
FIG. 10 is a schematic diagram of interactions between modules in the acceleration node shown in FIG. 9.

FIG. 10 is a schematic diagram of interactions between the foregoing agent module 112, logic processing module 114, and storage module 116. After receiving a packet of the mobile terminal 20 or the application server 103, the agent module 112 performs a preprocessing operation. The foregoing preprocessing operation, for example, may include a packet integrity check. If the packet is complete, the agent module 112 forwards the packet to the logic processing module 114. If the packet is incomplete, the agent module 112 may request the mobile terminal 20 or the application server 103 to resend the packet.

Figure 11:
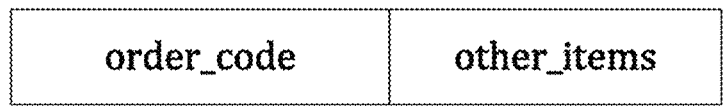
FIG. 11 is a schematic structural diagram of a message used in the interactions between the modules in the acceleration node shown in FIG. 9.

Interactions between the agent module 112, the logic processing module 114, and the storage module 116 use a short connection, and a network connection may be established when it needs to be used. In addition, interactions between the agent module 112, the logic processing module 114, and the storage module 116 use a predetermined message format. FIG. 11 is a schematic diagram of an example of the foregoing message format. A message includes a command word (order_code) and other content (other_items). Here, the command word may be the foregoing protocol signaling. For example, in a packet sent by the mobile terminal 20 to the agent module 112, the command word may include a command word that indicates a complete packet to be sent to the application server 103. The command word, for example, may include information that indicates whether the packet is uplink or downlink. Other content may include the length of the packet, a UIN of the mobile terminal 10, a sequence number of the message, a data text, or the like.

Specifically, after receiving the packet sent by the agent module 112, the logic processing module 114 performs the following operation: forwarding the packet to the storage module 116 for local buffering. Whether storage succeeds or not, the storage module 116 returns confirmation information to the logic processing module 114.

If the storage fails, the logic processing module 114 keeps the command word in the packet unchanged, and returns the packet to the agent module 112.

If the storage succeeds, the logic processing module 114 keeps the command word in the packet unchanged, and returns the packet to the agent module 112. Moreover, the logic processing module 114 may also read, from a configuration file, a response command word for the received command word, assemble a response packet according to the response command word, and send the response packet to the agent module 112.

For each packet from the logic processing module 114, the agent module 112 may determine, according to the command word, whether the packet is sent to the mobile terminal 20 or the application server 103, and perform a corresponding sending operation.

The acceleration module 128 according to this embodiment distributes different functions into different modules. The agent module 112 may be responsible for forwarding only, the storage module 116 is responsible for storage only, and the logic processing is performed by the logic processing module 114. Because of division of module functions, each module is responsible for a single function, thereby greatly improving their reliabilities and performance. Moreover, a client-oriented agent module 112 cannot obtain data in the storage module 116 directly, thereby improving data security.

Figure 12:
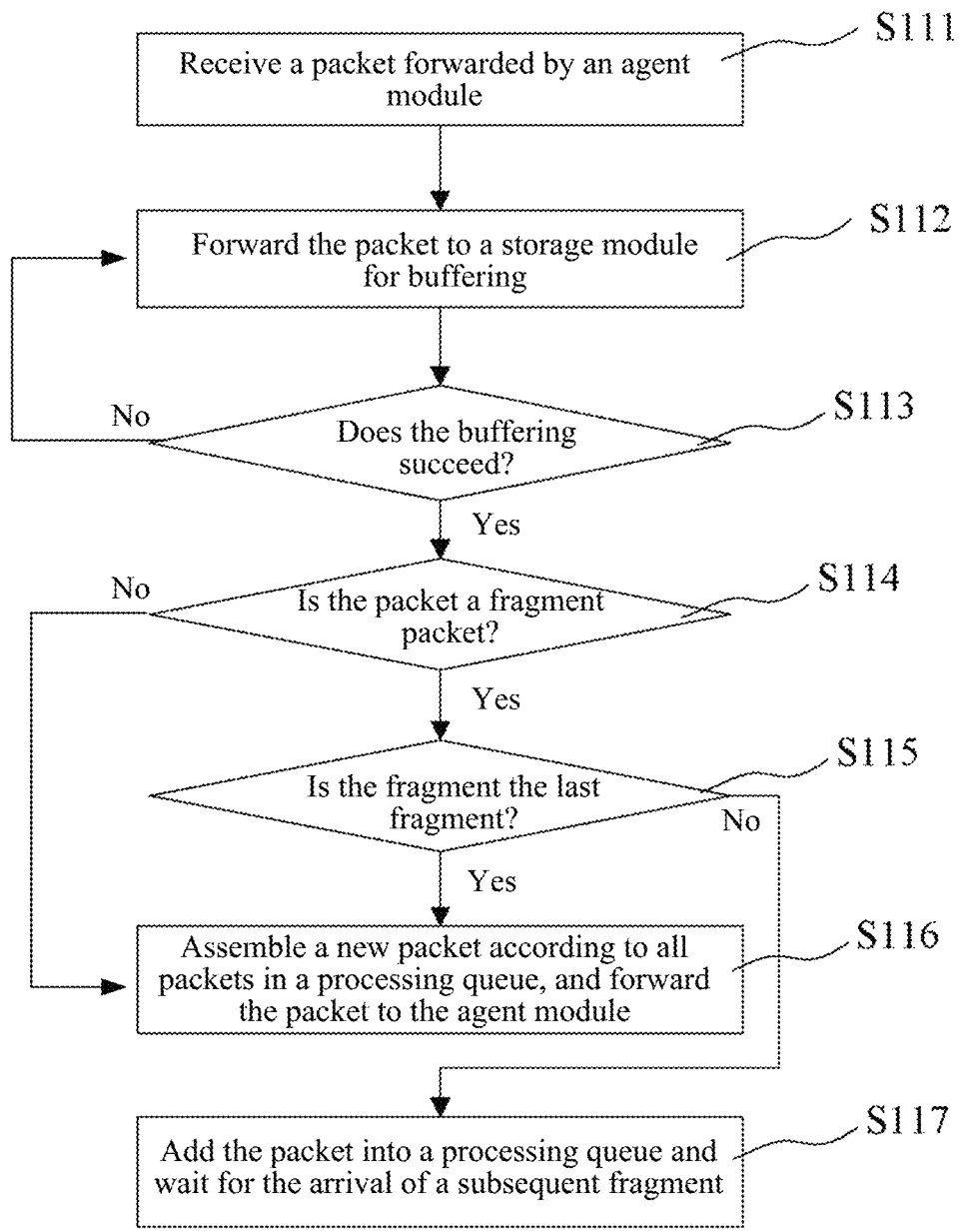
FIG. 12 is a schematic flowchart of a processing logic of a packet in the acceleration node shown in FIG. 9.

It can be understood that FIG. 10 only shows an example of logic processing of a packet by modules in the acceleration node 11. For example, the procedure of FIG. 10 may be used for processing of a non-fragment packet. However, the acceleration node 11 may further use different processing logic for packets of different types (for example, a fragment packet). The foregoing processing logic, for example, is implemented by the logic processing module 114. FIG. 12 is a flowchart of a processing logic of a packet in the acceleration node 11. The foregoing processing logic includes the following steps:

Step S111. Receive a packet forwarded by the agent module 112.

Step S112. Forward the received packet to the storage module 116 for buffering.

Step S113. Determine whether buffering succeeds according to confirmation information returned by the storage module 116, if buffering succeeds, perform Step S114, and otherwise, return a received packet intact to the agent module 112; or, perform Step S112 repeatedly for a predetermined number of times, and if buffering still fails after the predetermined number of times of retries, return the received packet intact to the agent module 112.

Step S114. Determine whether the packet is a fragment packet; for example, parse a field used to indicate whether the packet is a fragment packet from header information of the packet, thereby determining whether the packet is a fragment packet according to the field; if the packet is a fragment packet, perform Step S115; and otherwise, forward the received packet to the agent module 112, and send response information to the mobile terminal 20 or the central node 10 according to a predetermined protocol.

Step S115. Determine whether the fragment is the last fragment among fragments, if yes, perform Step S116, and otherwise, perform Step S117; for example, parse a field used to indicate a sequence number of a fragment from header information of the packet, and determine, in combination with sequence numbers of other fragments received before, whether the fragment is the last fragment among fragments. In an example, the logic processing module 114 may use a character string with a length of n to indicate states of all fragments, where n is a total number of the fragments, the k[1,n]th character in the character string is used to indicate whether the kth fragment is received. For example, 0 is used to indicate that the fragment is not received, while 1 is used to indicate that the fragment is received. Each time a fragment is received, a corresponding character may be set to a character A which is used to indicate that the fragment is received. When it is necessary to determine whether all the fragments are received, the character string may be compared with a character string [A,n]. If the two character strings are equal, all the fragments have been received. Here, the character string [A,n] indicates a character string with a length of n and each character is A.

Step S116. Assemble a new packet according to all packets in a processing queue, and forward the packet to the agent module. After receiving all fragments, the logic processing module 114 may parse data included in all fragment packets, and reconnect the data included in all the fragment packets to obtain original data. Further, the original data may be assembled in a signal packet, or may be reprocessed fragment by fragment. A fragment length in the logic processing module 114 may be different from a fragment length in the mobile terminal 20. Generally, the fragment length in the logic processing module 114 may be greater than the fragment length in the mobile terminal 20. It can be understood that in network data transmission, the length of a packet affects a success rate of network transmission. Generally, a packet loss phenomenon occurs more easily for a longer packet. Therefore, the success rate of transmission can be improved by reducing the size of the packet, but a data transmission rate is reduced at the same time. The mobile terminal 20 is generally connected to the Internet through an average user-oriented network such as a mobile communications network, and its network quality cannot be ensured. To ensure the success rate of sending a packet by the mobile terminal 20, the size of a fragment of the packet may be set to a relatively small value. The acceleration node 11 generally may be connected to the Internet through a high speed and reliable network connection. Therefore, the size of the packet in the acceleration node 11 may be bigger than that in the mobile terminal 20, thereby improving the rate of network data transmission. By using Step S116, not only a success rate of sending a packet of the mobile terminal 20 can be improved, but also a data sending rate of the acceleration node 11 can be improved.

Step S117. Add the packet into a processing queue and wait for the arrival of a subsequent fragment. As described above, the forwarding of the packet is performed by the agent module 112. As long as the logic processing module 114 does not forward the packet to the agent module 112, the packet is not sent to the mobile terminal 20 or the central node 10.

Figure 13:
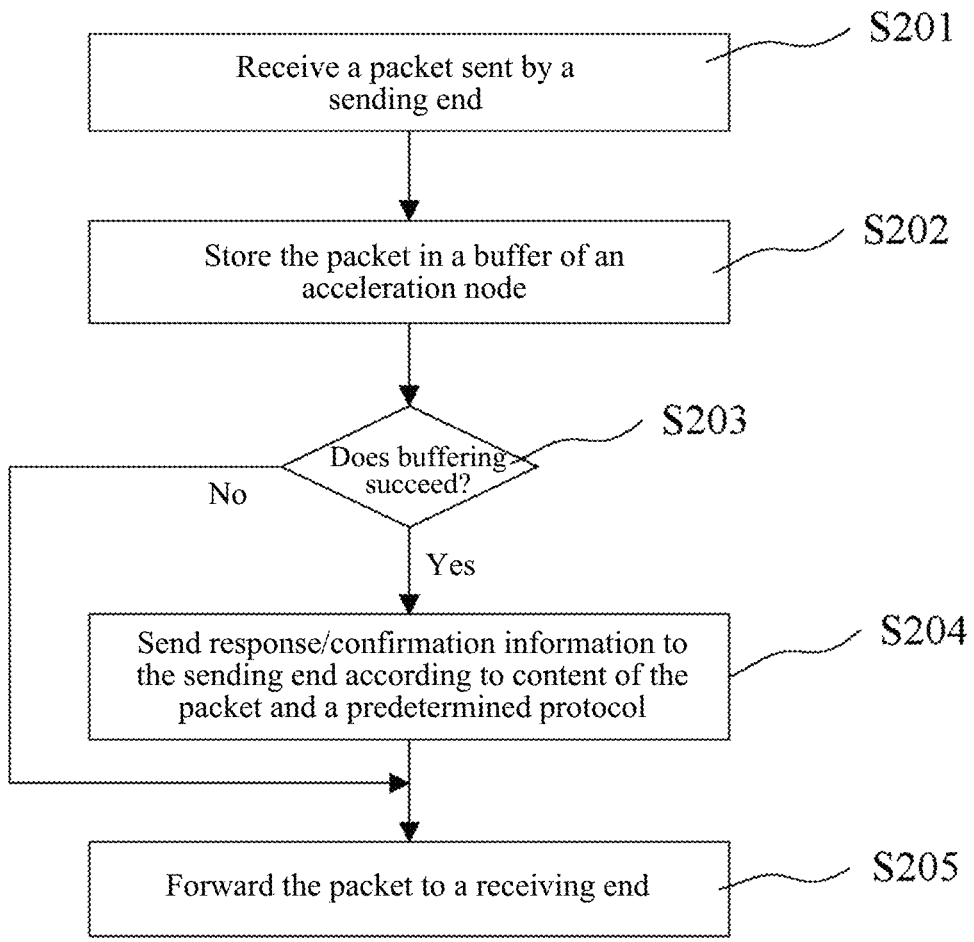
FIG. 13 is a flowchart of a method for transmitting data in a network system according to a second embodiment.

FIG. 13 is a flowchart of a method for transmitting data in a network system according to a second embodiment. The method of this embodiment may be used in the acceleration node 11 shown in FIG. 1. As shown in FIG. 13, the method of this embodiment includes the following steps:

Step S201. Receive a packet sent by a sending end to a receiving end.

The sending end and the receiving end, for example, may respectively be the mobile terminal 20 shown in FIG. 1 and the application server 103 in the central node 10 (FIG. 2), or may respectively be the central node 10 and the mobile terminal 20. In other words, at least one of the sending end and the receiving end is a data center (central node 10). Step S201, for example, may be performed by the agent module 112 shown in FIG. 9. After receiving the packet sent by the sending end, the agent module 112 may forward the packet to the logic processing module 114 to perform Step S202.

Step S202. Store the packet in a buffer of the acceleration node.

After receiving the packet sent by the agent module 112, the logic processing module 114 forwards the packet to the storage module 116 for buffering. It can be understood that each packet is associated with one mobile terminal 20 (or another sending end), and one UIN may be allocated to each mobile terminal 20. Therefore, two message queues may be stored in the buffer for each mobile terminal 20 and are used to buffer an uplink (for example, from the mobile terminal 20 to the application server 103) packet and a downlink (for example, from the application server 103 to the mobile terminal 20) packet. Each packet in the queue has a unique message sequence number for use as a unique identifier. The storage module 116 may send a confirmation message of a storage result to the logic processing module 114.

Step S203. Determine whether the packet is successfully stored in the buffer of the acceleration node, if yes, perform Step S204, and otherwise, perform Step S205.

The logic processing module 114 may determine whether the buffering succeeds according to the confirmation message returned by the storage module 116. If the buffering fails, the logic processing module 114 may further forward the packet to the storage module 116 again for storage. Stop retrying after a predetermined number of times of retries, and the buffering fails.

Step S204. Send response information to the sending end according to content of the packet and a predetermined protocol.

If the packet is buffered in a local buffer successfully, the agent module 112 may forward the packet to the receiving end. Moreover, the logic processing module 114 may further assemble the response information for the packet according to the predetermined protocol and forward the response information to the agent module 112. The agent module 112 sends the response information to the sending end.

For example, if the packet is a complete packet, the acceleration server sends response information used to indicate that the packet is received; or if the packet is the last fragment among fragments, the acceleration server sends response information used to indicate that a complete packet is received; or if the packet is a fragment other than the last fragment among the fragments, the acceleration server sends fragment response information.

It should be noted that after Step S204 is performed, Step S205 may be performed next. Moreover, it can be understood that performing of Step S204 and performing of Step S205 are not limited. Step S204 may also be performed after Step S205.

Step S205. Forward data included in the packet to the receiving end.

Step S205 may include: forwarding the packet to the receiving end directly; or forwarding the packet to a next acceleration node directly, so that the next acceleration node forwards the packet to the receiving end.

If the packet is to be sent to the application server 103, the packet is forwarded to the application server 103 by using an established network connection to the application server 103.

If the packet is to be sent to the mobile terminal 20, a corresponding network connection is obtained by using a UIN of the mobile terminal 20, and the packet is sent to the mobile terminal 20 by using the obtained network connection.

Moreover, in addition to forwarding the packet directly, it may also be extracting included data from the packet, and reassembling the packet to forward the packet to the receiving end directly or indirectly. To forward the packet directly described above means to forward the packet directly to the receiving end without further using another acceleration node 11. To forward the packet indirectly means to send the packet to another acceleration node 11 first, and the other acceleration node 11 forwards the packet to the receiving end.

Further, the procedure described above is only a universal processing procedure of a packet. However, for a packet of a specific type, a specific process logic may also be used. For example, for a fragment packet, the procedure shown in FIG. 12 may also be used for processing.

The method according to this embodiment can greatly reduce a network delay of data transmission and improve efficiency of data transmission.

Figure 14:
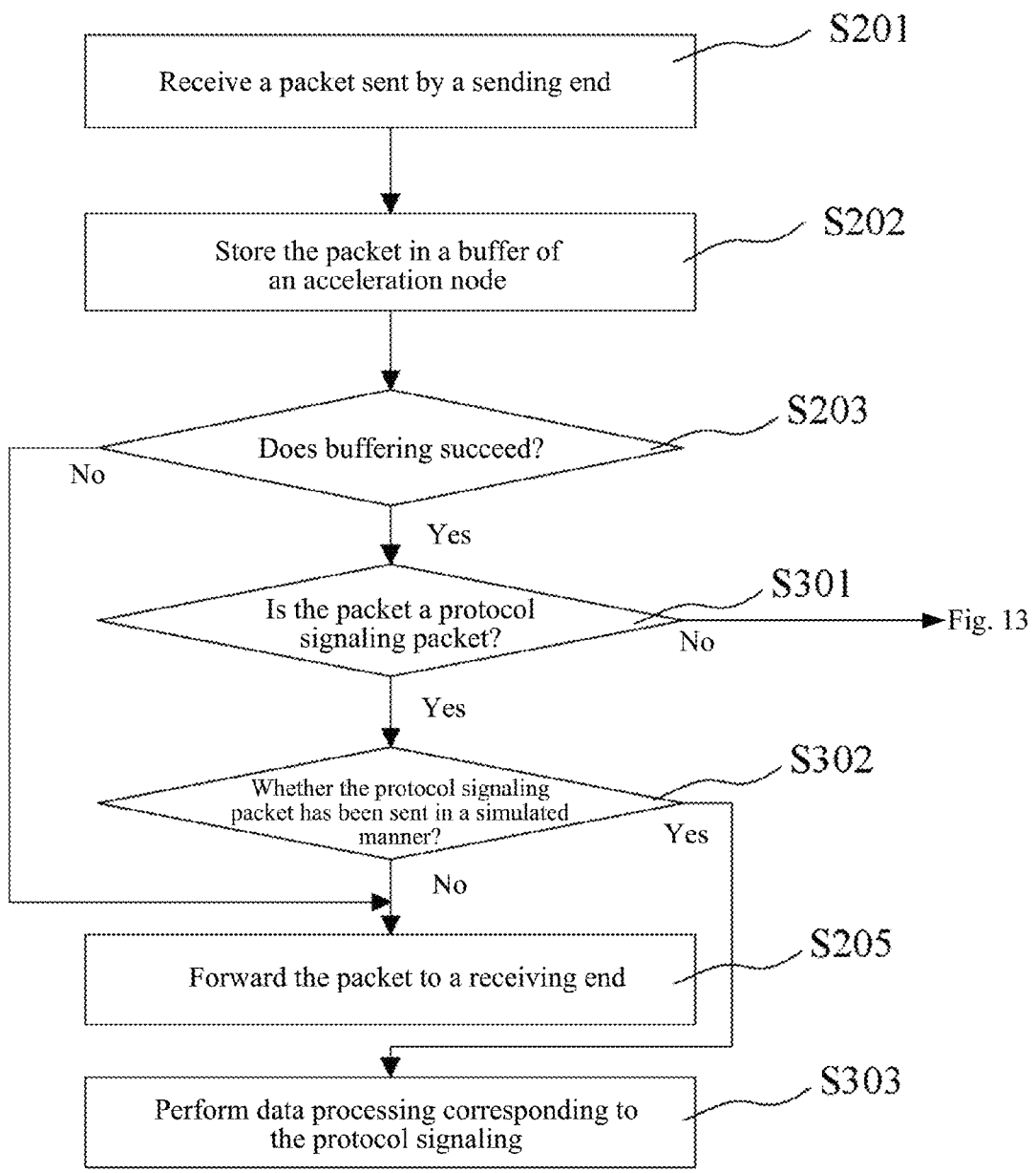
FIG. 14 is a flowchart of a method for transmitting data in a network system according to a third embodiment.

FIG. 14 is a flowchart of a method for transmitting data in a network system according to a third embodiment. The method of this embodiment may be used in the acceleration node 11 shown in FIG. 1. As shown in FIG. 14, the method of this embodiment is similar to the method of FIG. 12, and a difference lies in that, in Step S203, if the packet is successfully stored in the buffer of the acceleration node, perform Step S301.

Step S301. Determine whether the packet is a protocol signaling packet. The protocol signaling packet refers to a packet which includes only protocol signaling rather than data text. For example, after receiving a packet, the mobile terminal 20 or application server 103 may send a confirmation packet used to confirm with the application server 103/mobile terminal 20 that a packet is received. This type of packet may not include data text but include protocol signaling data. If the packet is a protocol signaling packet, perform Step S302; if the packet is not a protocol signaling packet, process according to the procedure of FIG. 13.

Step S302. Determine whether the protocol signaling packet has been sent by the acceleration node, simulated as the receiving end, to the sending end, if the protocol signaling packet is not sent, perform Step S205, and otherwise, perform Step S303.

After receiving the packet, the receiving end sends response information according to a predetermined protocol. Due to the existence of the acceleration node 11, the response information is sent to the acceleration node 11. However, according to the procedure of FIG. 12, in the acceleration node 11, after a packet is buffered successfully, not only the packet is forwarded to the receiving end, but also the response information is sent to the sending end. In other words, for a successfully buffered packet, the response information substantially has been sent by the acceleration node 11, simulated as the receiving end, to the sending end. Therefore, in Step S302, information such as a UIN of a corresponding mobile terminal 20, a sequence number of the packet, and whether the packet is uplink or downlink may be parsed from the protocol signaling packet. The information may be used to identify one or more associated packets associated with the protocol signaling packet. Next, the buffer may be searched for the associated packet. If the associated packet is found successfully, it indicates that the response information of the associated packet has been sent. Otherwise, the response information of the associated packet is not sent.

Step S303. Perform data processing corresponding to the protocol signaling.

Different data processing processes may be performed correspondingly according to different protocol signaling.

For example, if the protocol signaling is the confirmation information in which it is confirmed that the receiving end receives a designated packet, delete the designated packet from the buffer. In this way, storage space consumed by buffering may be reduced, and storage efficiency of the buffer may be improved.

For example, if the protocol signaling is request information in which the receiving end requests resending of the designated packet, resend the designated packet to the receiving end. In this way, high reliability of sending a packet may be ensured.

According to the method of this embodiment, when a received packet is a protocol signaling packet, an acceleration node 11 may perform data processing according to a predetermined protocol, which may improve reliability and efficiency of data processing.

Figure 15:
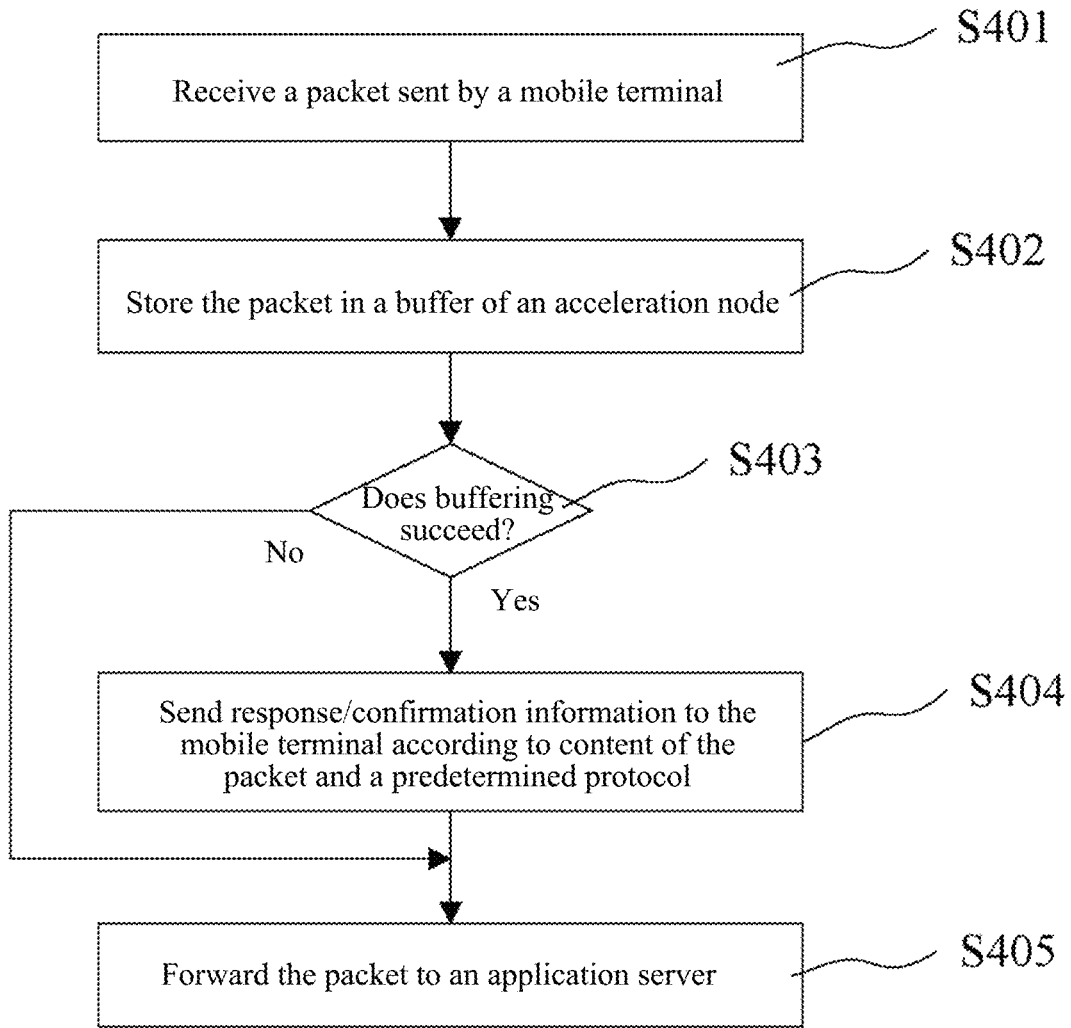
FIG. 15 is a flowchart of a method for transmitting data in a network system according to a fourth embodiment.

FIG. 15 is a flowchart of a method for transmitting data in a network system according to a fourth embodiment. The method of this embodiment may be used in the acceleration node 11 shown in FIG. 1. As shown in FIG. 15, the method of this embodiment includes the following steps:

Step S401. Receive a packet sent by the mobile terminal.

When the mobile terminal 20 needs to send data, for example, a user inputs a piece of text or voice on a dialog interface provided by the application program 226 and triggers a sending condition (for example, taps a predetermined button or stops speaking), the application program 226 assembles content to be sent into a packet according to a predetermined protocol, and sends the packet by using an established network connection. The packet generally may include header information and packet text. The header information may include information of the central node 10 to which the packet is sent, and other control information, for example, whether the packet is a fragment packet. If the packet is a fragment packet, the packet may further include a parent packet identifier used to correlate multiple fragment packets. The packet text may include encoded data of the foregoing text or voice.

Step S402. Store the packet in the buffer of the acceleration node.

After receiving the packet sent by the mobile terminal, the acceleration node 11 attempts to store the received packet in a local buffer. It can be understood that each packet is associated with one mobile terminal 20 (or another sending end), and one UIN may be allocated to each mobile terminal 20. Therefore, two message queues may be stored in the buffer for each mobile terminal 20 and are used to buffer an uplink (for example, from the mobile terminal 20 to the application server 103) packet and a downlink (for example, from the application server 103 to the mobile terminal 20) packet. Each packet in the queue has a unique message sequence number for use as a unique identifier.

Step S403. Determine whether the packet is successfully stored in the buffer of the acceleration node, if yes, perform Step S404, and otherwise, perform Step S405.

The acceleration node 11 submits the packet to a storage module for buffering, receives confirmation information returned by the storage module, and determines, according to the confirmation information, whether buffering succeeds.

Step S404. Send response information to the mobile terminal according to content of the packet and a predetermined protocol.

If the packet is buffered in the local buffer successfully, the acceleration server in the acceleration node 11 may forward the packet to the application server 103, and may be simulated as the application server 103 to respond to the packet.

For example, if the packet is a complete packet, the acceleration server sends response information used to indicate that the packet is received; or if the packet is the last fragment among fragments, the acceleration server sends response information used to indicate that a complete packet is received; or if the packet is a fragment other than the last fragment among the fragments, the acceleration server sends fragment response information.

It should be noted that after Step S404 is performed, Step S405 may be performed next. Moreover, it can be understood that performing of Step S404 and performing of Step S405 are not limited. Step S404 may also be performed after Step S405.

Step S405. Forward the packet to the application server.

Specifically, the packet may be forwarded to the application server 103 by using an established network connection to the application server 103.

The method according to this embodiment can greatly reduce a network delay when a mobile terminal sends data to an application server and improve efficiency of data transmission.

Figure 16:
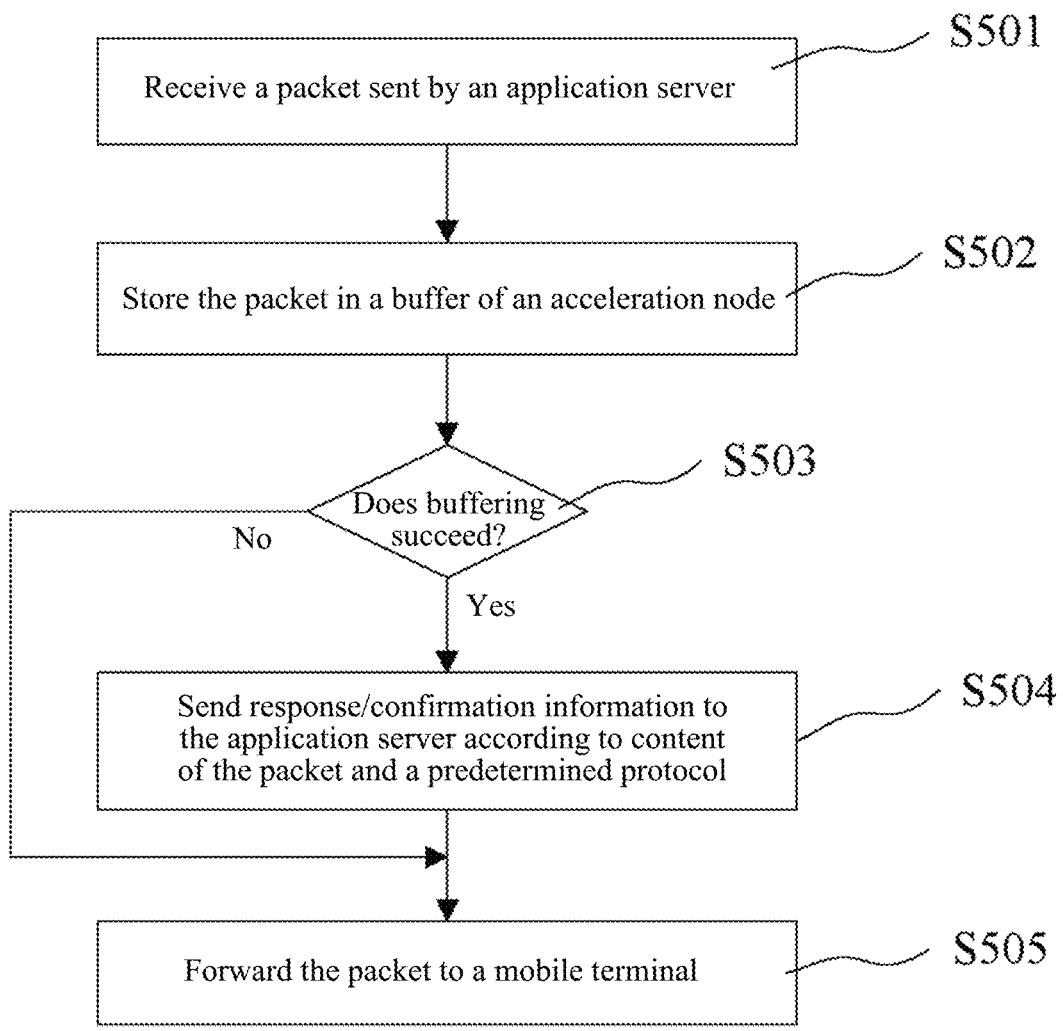
FIG. 16 is a flowchart of a method for transmitting data in a network system according to a fifth embodiment.

FIG. 16 is a flowchart of a method for transmitting data in a network system according to a fifth embodiment. The method of this embodiment may be used in the acceleration node 11 shown in FIG. 1. As shown in FIG. 16, the method of this embodiment includes the following steps:

Step S501. Receive a packet sent by an application server.

The application server may provide one or more network services, for example, a network communication service, and forward messages between devices of two or more users (for example, the mobile terminal 20). When a first user sends a message to a second user, the application server first receives the message sent by the first user, and is responsible for pushing the message to one or more terminals (for example, the mobile terminal 20) used by the second user currently. Specifically, the application server searches for a corresponding network connection by using a UIN of the mobile terminal, and sends the packet through the network connection. According to the architecture shown in FIG. 1, the packet is sent to the acceleration node 11. Further, as shown in FIG. 9, the packet is received by the agent module 112. After receiving the packet, the agent module 112 forwards the packet to the logic processing module 114 to perform Step S502.

Step S502. Store the packet in a buffer of the acceleration node.

After receiving the packet sent by the agent module 112, the logic processing module 114 forwards the packet to a storage module 116 for buffering.

Step S503. Determine whether the packet is successfully stored in the buffer of the acceleration node, if it succeeds, perform Step S504, and otherwise, perform Step S505.

The logic processing module 114 may determine whether the buffering succeeds according to a confirmation message returned by the storage module 116. If the buffering fails, the logic processing module 114 may further forward the packet to the storage module 116 again for storage. Stop retrying after a predetermined number of times of retries, and the buffering fails.

Step S504. Send response information to the application server according to content of the packet and a predetermined protocol.

If the packet is buffered in a local buffer successfully, the acceleration server in the acceleration node 11 may forward the packet to the application server 103, and may be simulated as the application server 103 to respond to the packet.

For example, if the packet is a complete packet, the acceleration server sends response information used to indicate that the packet is received; or if the packet is the last fragment among fragments, the acceleration server sends response information used to indicate that a complete packet is received; or if the packet is a fragment other than the last fragment among the fragments, the acceleration server sends fragment response information.

Specifically, the logic processing module 114 assembles a response packet according to response information to be sent and sends the response packet to the agent module 112. The agent module 112 performs corresponding forwarding according to a command word in the response packet.

It should be noted that after Step S504 is performed, Step S505 may be performed next. Moreover, it can be understood that performing of Step S504 and performing of Step S505 are not limited. Step S504 may also be performed after Step S505.

Step S505. Forward the packet to the mobile terminal.

The agent module 112 may obtain a corresponding network connection according to a UIN of the mobile terminal 20 included in the packet, and subsequently send the packet by using the obtained network connection.

The method according to this embodiment can greatly reduce a network delay when an application server sends data to a mobile terminal and improve efficiency of data transmission.

Figure 17:
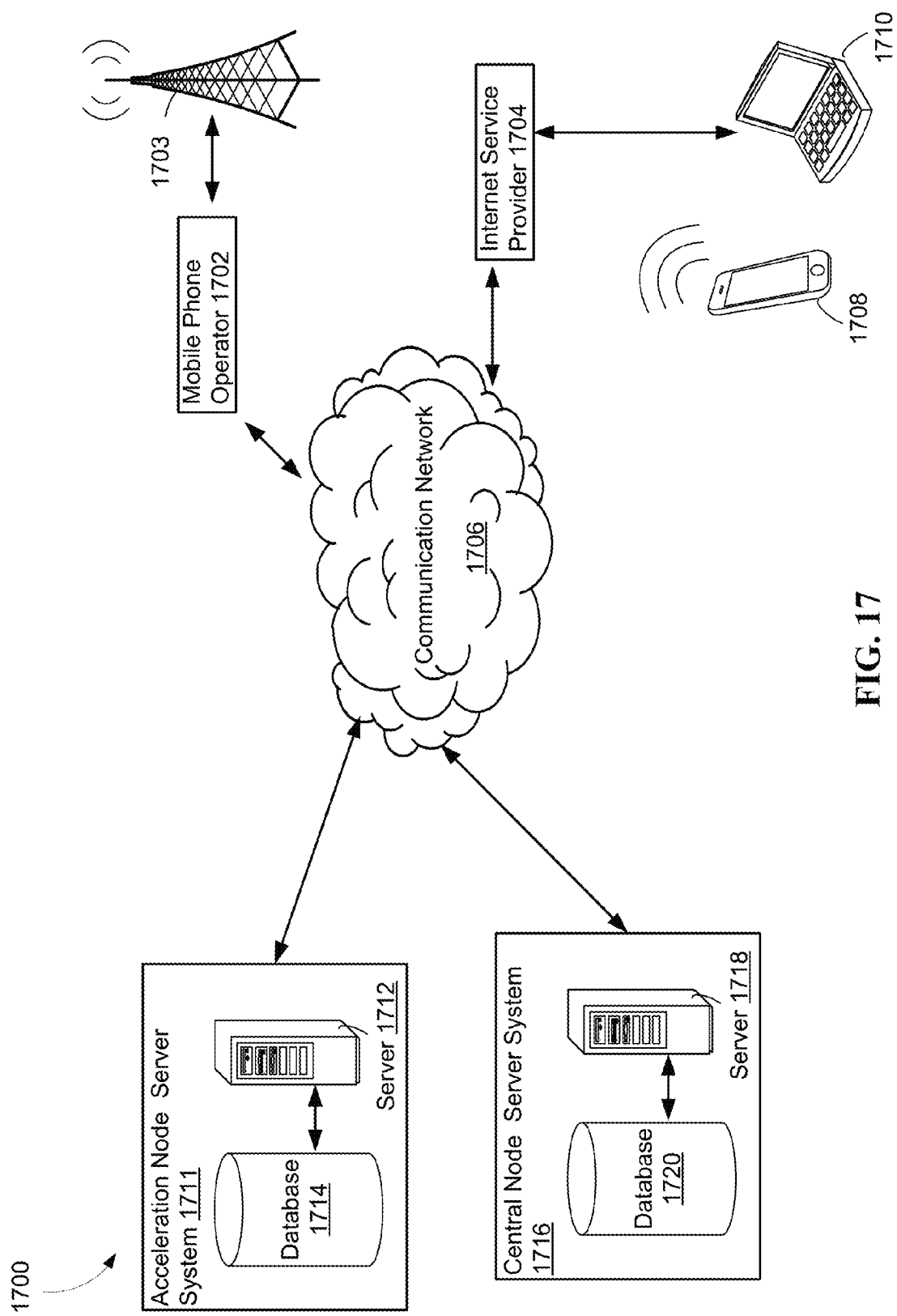
FIG. 17 is a block diagram of a client-server environment for transmitting and receiving data at an acceleration node in accordance with some embodiments.

FIG. 17 is a diagram of a client-server environment 1700 for transmitting and receiving data at an acceleration node, in accordance with some embodiments of the present application. While certain specific features are illustrated, those skilled in the art will appreciate from the present disclosure that various other features have not been illustrated for the sake of brevity and so as not to obscure more pertinent aspects of the implementations disclosed herein. To that end, the client-server environment 1700 includes one or more mobile phone operators 1702, one or more internet service providers 1704, and a communications network 1706.

The mobile phone operator 1702 (e.g., wireless carrier), and the Internet service provider 1704 are capable of being connected to the communication network 1706 in order to exchange information with one another and/or other devices and systems. Additionally, the mobile phone operator 1702 and the Internet service provider 1704 are operable to connect client devices to the communication network 1706 as well. For example, a smart phone 1708 is operable with the network of the mobile phone operator 1702, which includes for example, a base station 1703. Similarly, for example, a laptop computer 1710 (or tablet, desktop, smart television, workstation or the like) is connectable to the network provided by an Internet service provider 1704, which is ultimately connectable to the communication network 1706.

The communication network 1706 may be any combination of wired and wireless local area network (LAN) and/or wide area network (WAN), such as an intranet, an extranet, including a portion of the Internet. It is sufficient that the communication network 1706 provides communication capability between client devices (e.g., smart phones 1708 and personal computers 1710) and servers. In some implementations, the communication network 1706 uses the HyperText Transport Protocol (HTTP) to transport information using the Transmission Control Protocol/Internet Protocol (TCP/IP). HTTP permits a client device to access various resources available via the communication network 1706. However, the various implementations described herein are not limited to the use of any particular protocol.

In some implementations, the client-server environment 1700 further includes an acceleration node server system 1711. Within the acceleration node server system 1711, there is a server computer 1712 (e.g., a network server such as a web server) for receiving and processing data received from one or more client devices 1708/1710 (e.g., a connection-establishment request or one or more packet fragments). In some implementations, the acceleration node server system 1711 stores (e.g., in a database 1714) and maintains one or more unique identification numbers (e.g., unique identification numbers for respective client devices 1708/1710, to buffer packets or packet fragments for respective client devices 1708/1710) and stores and maintains one or more packets or packet fragments (e.g., by caching or buffering them). In some embodiments, the acceleration node server system 1711 is one of a plurality of acceleration node server systems in client-server environment 1700.

In some implementations, the acceleration node server system 1711 sends and receives various communications to and from a client device 1708/1710, and central node server system 1716. In some embodiments, these communications or the information in these communications are stored and retrieved from database 1714. In some embodiments, the acceleration node server system 1711 sends or receives communications of data and/or status from client device 1708/1710 (e.g., a connection-establishment request, a connection-confirmation message, or one or more packet fragments) and in some embodiments, the acceleration node server system 1711 sends or receives communications of data and/or status from central node server system 1716 (e.g., a connection-establishment request, a connection-confirmation message, or one or more packet fragments).

In some implementations, central node server system 1716 includes a server computer 1720 (e.g., a network server such as a web server) for receiving and processing data received from one or more acceleration node server systems 1711 (e.g., one or more packet fragments for processing at the central node server system 1716, from one or more client devices 1708/1710). In some implementations, the central node server system 1716 stores (e.g., in a database 1718) and maintains information that correlates one or more packet fragments to a respective client device 1708/1710 via a respective acceleration node server system 1711 (e.g., the central node server system 1716 keeps track of which acceleration node server system 1711 serves one or more specific client devices 1708/1710).

Those skilled in the art will appreciate from the present disclosure that any number of such devices and/or systems may be provided in a client-server environment, and particular devices may be altogether absent. In other words, the client-server environment 1700 is merely an example provided to discuss more pertinent features of the present disclosure. Additional server systems, such as domain name servers and client distribution networks may be present in the client-server environment 1700, but have been omitted for ease of explanation.

Figure 18:
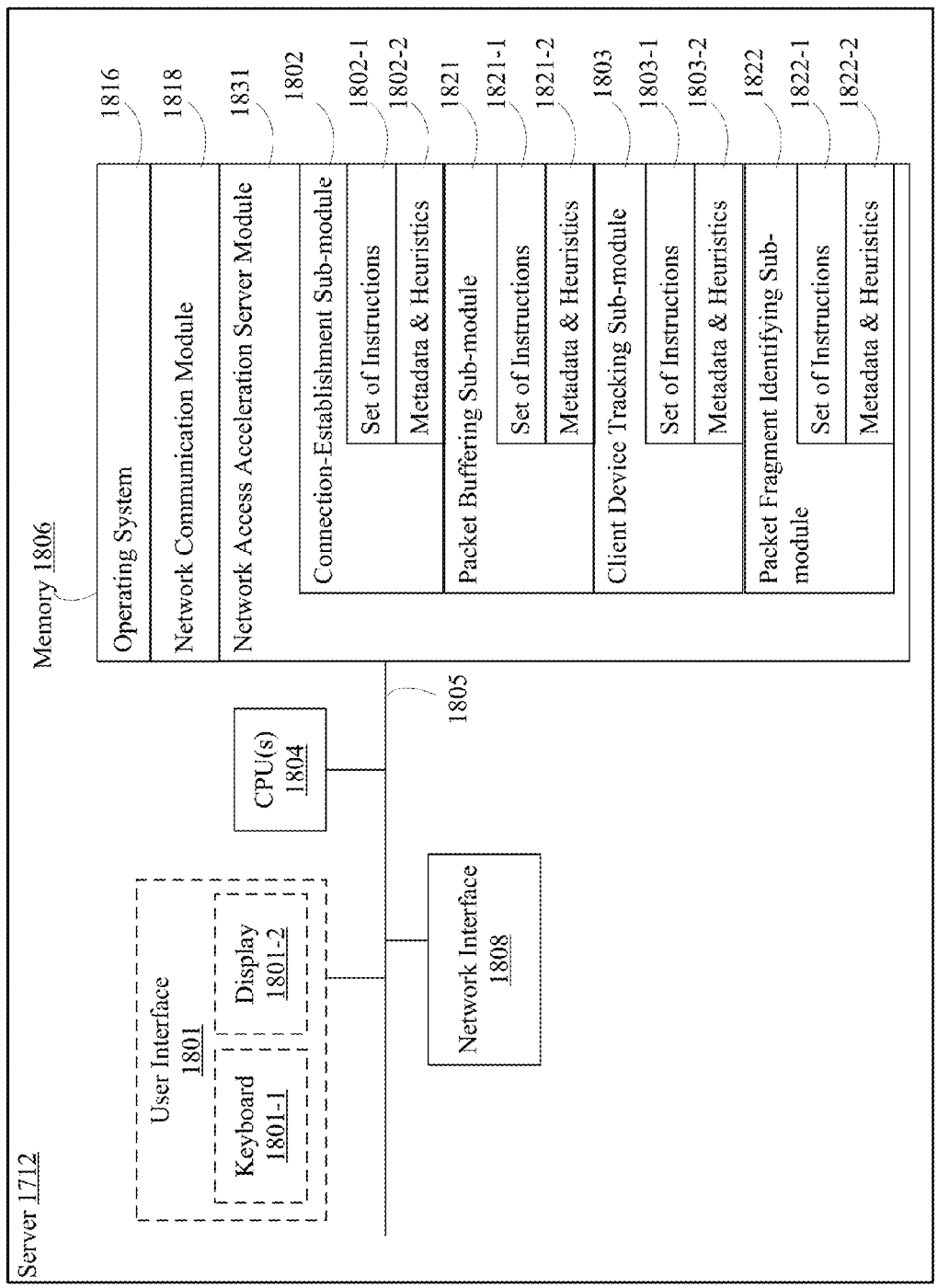
FIG. 18 is a block diagram of an exemplary server for transmitting and receiving data at an acceleration node in accordance with some embodiments.

FIG. 18 is a diagram of an example implementation of the acceleration node server 1712, in accordance with some implementations of the present application. While certain specific features are illustrated, those skilled in the art will appreciate from the present disclosure that various other features have not been illustrated for the sake of brevity and so as not to obscure more pertinent aspects of the implementations disclosed herein.

Server 1712 includes one or more processing units (CPU's) 1804, one or more network or other communications interfaces 1808, an optional user interface 1801 (optionally comprising elements such as a keyboard 1801-1 or display 1801-2), memory 1806, and one or more communication buses 1805 for interconnecting these and various other components. The communication buses 1805 may include circuitry (sometimes called a chipset) that interconnects and controls communications between system components. Memory 1806 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1806 may optionally include one or more storage devices remotely located from the CPU(s) 1804. In some embodiments, memory 1806, including the non-volatile and volatile memory device(s) within memory 1806, comprises a non-transitory computer readable storage medium.

In some implementations, memory 1806 or the non-transitory computer readable storage medium of memory 1806 stores the following programs, modules and data structures, or a subset thereof including an operating system 1816, a network communication module 1818, and a network access acceleration server module 1831.

The operating system 1816 includes procedures for handling various basic system services and for performing hardware dependent tasks.

The network communication module 1818 facilitates communication with other devices (e.g., client devices 1708/1710), central node servers or other acceleration node server systems via the one or more communication network interfaces 1808 (wired or wireless) and one or more communication networks, such as the internet, other wide area networks, local area networks, metropolitan area networks, and so on.

In some implementations, the network access acceleration server module 1831 includes a connection-establishment sub-module 1802 for receiving (or sending) connection-establishment requests from one or more client devices (e.g., client device 1708/1710) or central node servers and sending (or receiving) connection-confirmation messages to client devices or central node servers. In some embodiments, connection-establishment sub-module 1802 retains connection information with client devices and/or central node servers, and in some embodiments, with other acceleration node server systems (e.g., to share traffic). In some embodiments, the connection-establishment sub-module 1802 retains information regarding one or more central node servers that server 1712 is connected to, such as the country that the central node server is located in, the application running on the central node server (e.g., an instant messaging application, a gaming application, an online retail application) and which client devices are using a particular central node server or application. To this end, the connection-establishment sub-module 1802 includes a set of instructions 1802-1 and, optionally, metadata 1802-2.

In some implementations, the network access acceleration server module 1831 includes a packet buffering sub-module 1821 having a set of instructions 1821-1 (e.g., to buffer data packets or data packet fragments received from either a client device, a central node server or another acceleration server) and, optionally, metadata 1821-2, as well as a client device tracking sub-module 1803 having a set of instructions 1803-1 (e.g., for storing one or more unique identification numbers for a respective client device connected to the acceleration node server) and optionally metadata 1803-2. In some implementations, the network access acceleration server module 1831 includes a packet fragment identifying sub-module 1822 having a set of instructions 1822-1 (e.g., for identifying packet fragments of one or more data packets received from a client device or central node server and merging them into one or more data packets) and, optionally, metadata 1822-2. In some embodiments, the network access acceleration server module 1831 also includes other modules to perform the functions of the server described with respect to FIGS. 20A-20D.

Figure 19:
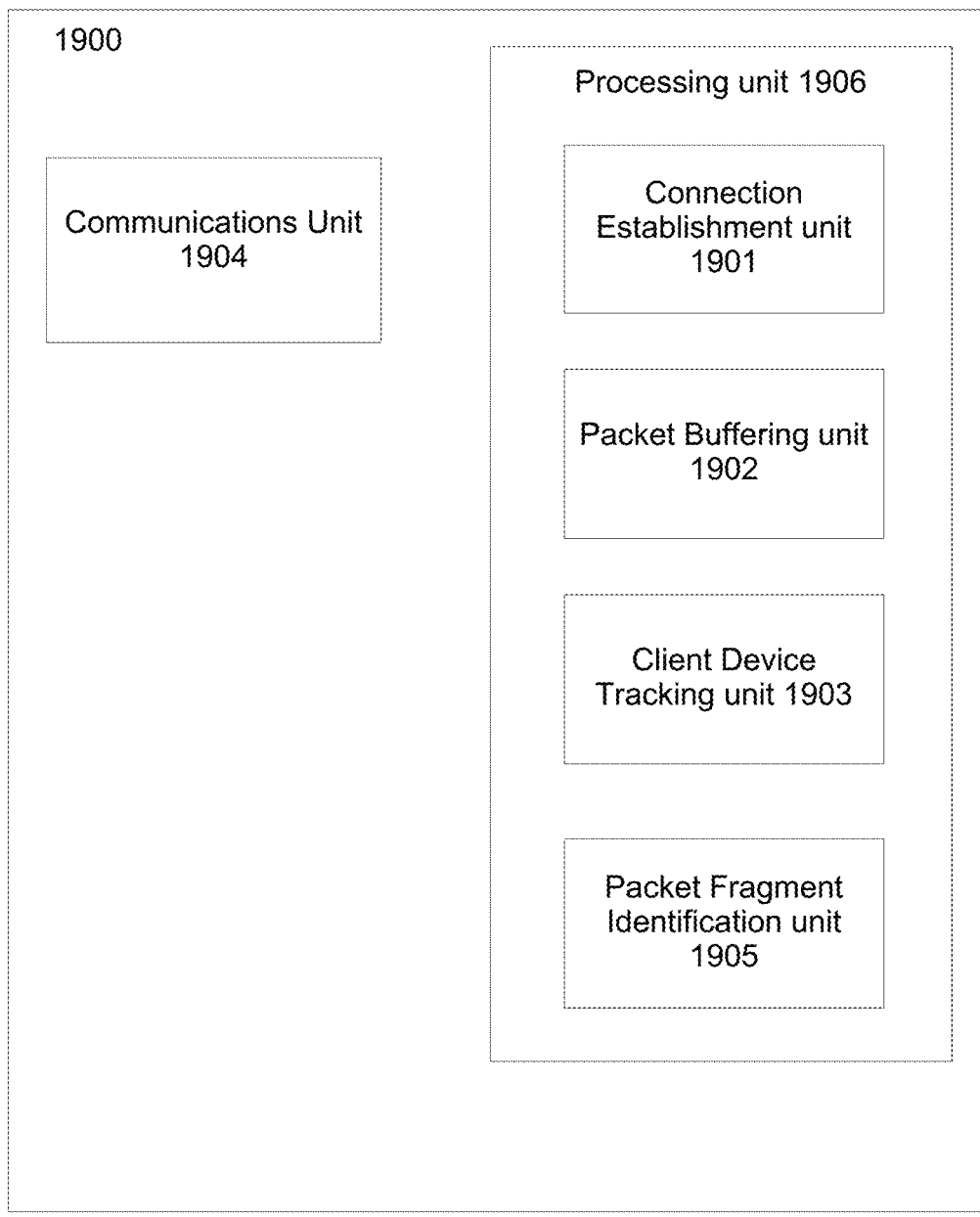
FIG. 19 is a block diagram of an apparatus of transmitting and receiving data at an acceleration node in accordance with some embodiments.
Figure 20B:
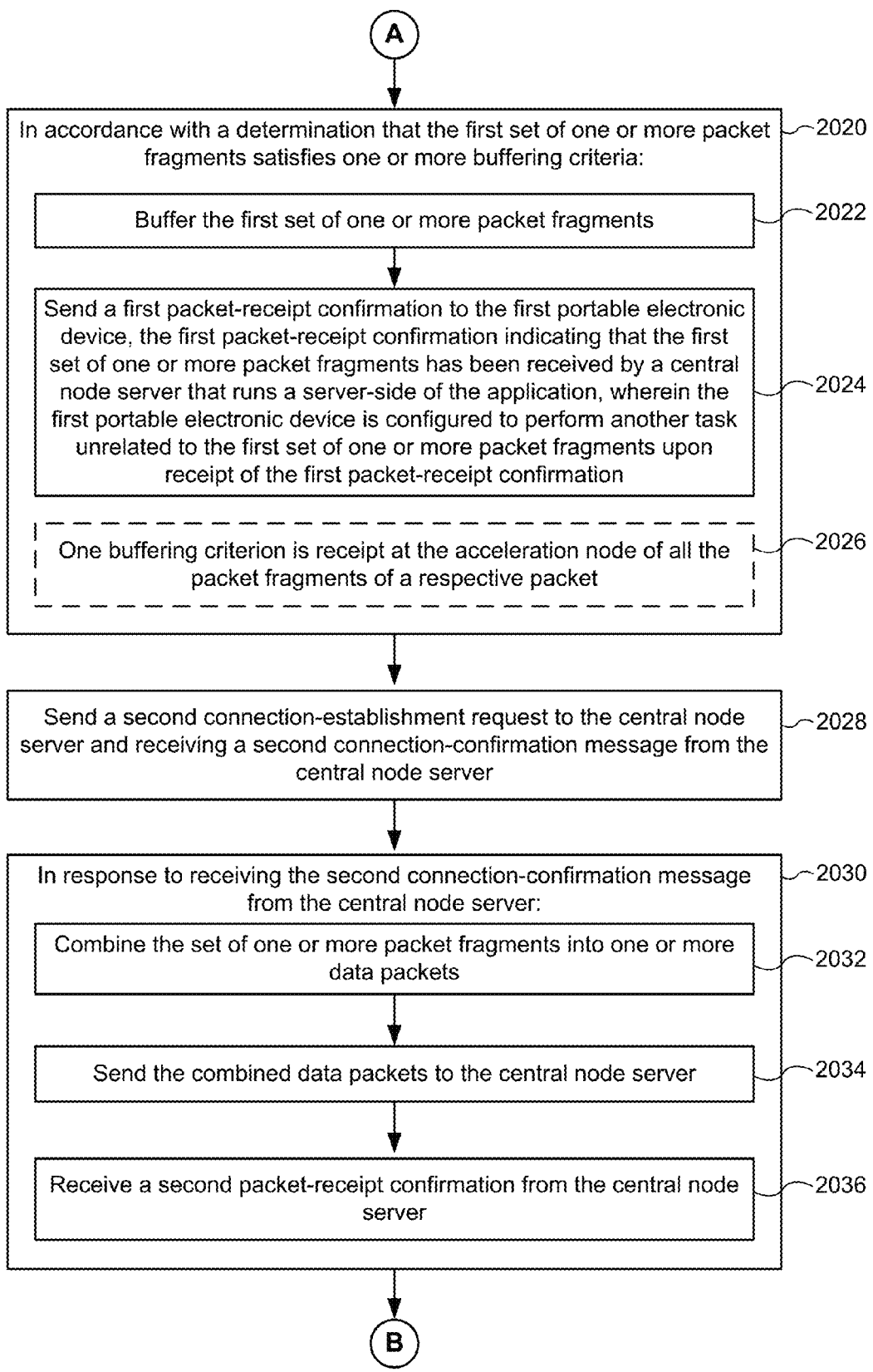
Figure 20C:
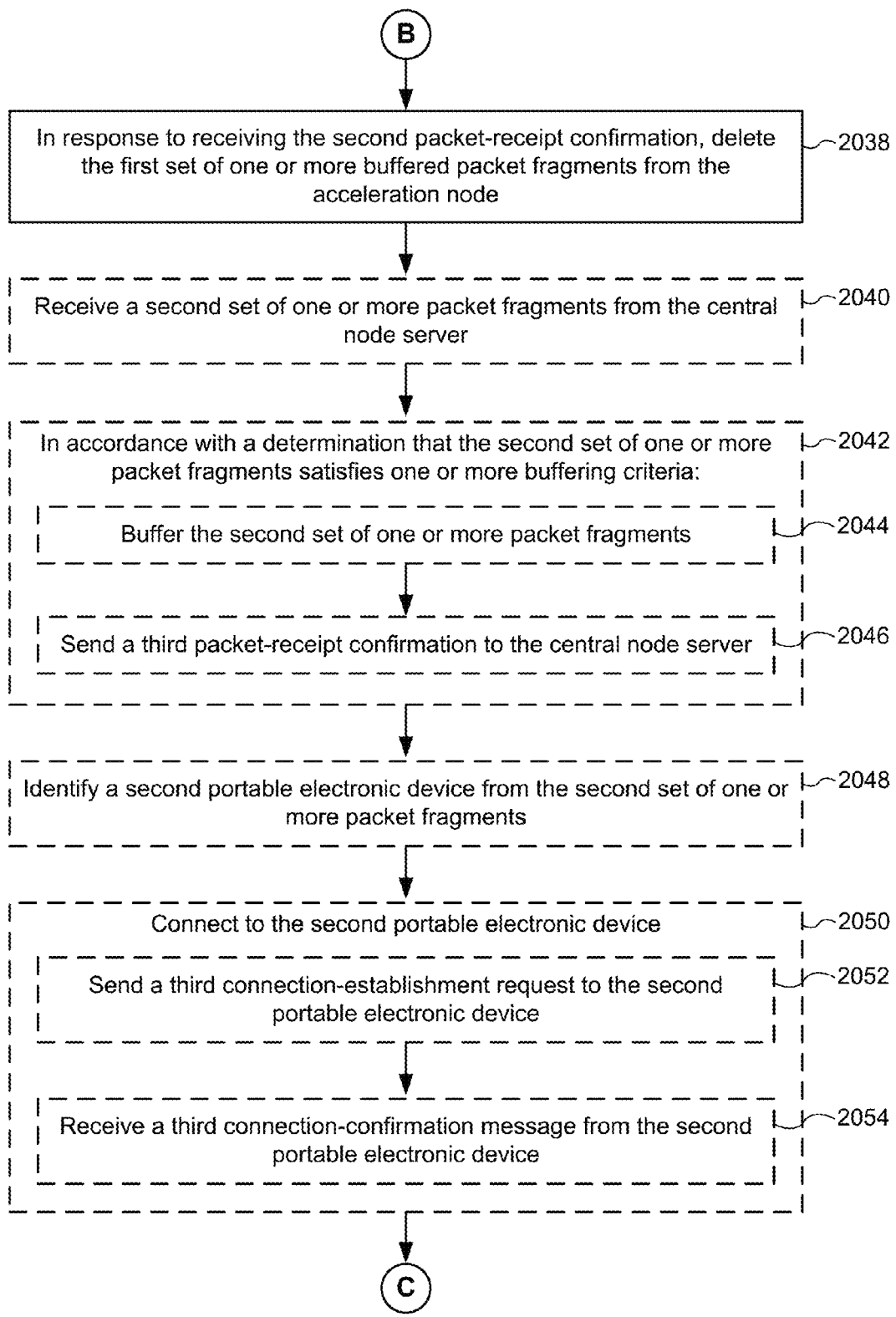
Figure 20D:
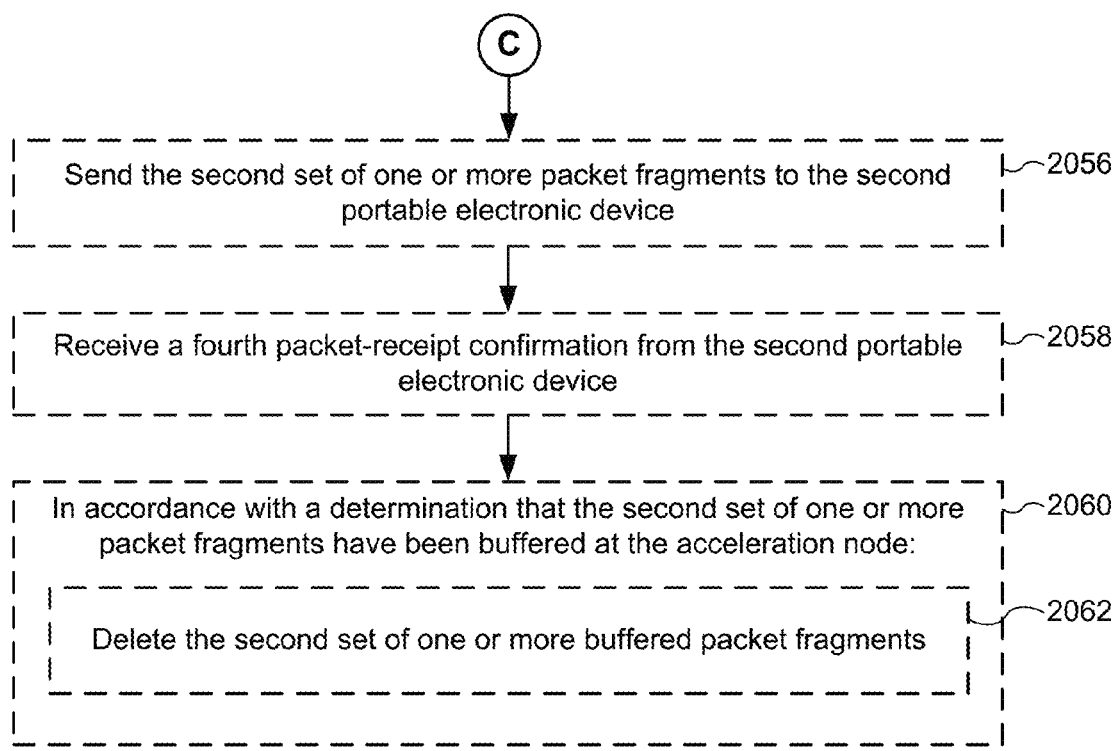

FIG. 19 is a block diagram of a realization apparatus 1900 of transmitting and receiving data at an acceleration node in accordance with some implementations of the present application.

As is shown in FIG. 19, this device includes: a communications unit 1904, and a processing unit 1906 comprising a connection establishment unit 1901, packet buffering unit 1902, client device tracking unit 1903, and packet fragment identification unit 1905, among which:

Connection establishment unit 1901: configured to receive (or send) connection-establishment requests from one or more client devices (e.g., client device 1708/1710) or central node servers and send (or receive) connection-confirmation messages to client devices or central node servers, and retain connection information;

Packet buffering unit 1902: configured to buffer data packets or data packet fragments received from either a client device, a central node server or another acceleration server;

Client device tracking unit 1903: configured to store one or more unique identification numbers for a respective client device connected to the acceleration node server;

Packet fragment identification unit 1905: configured to identify packet fragments of one or more data packets received from a client device or central node server and merging them into one or more data packets; and Communications unit 1904 is configured to send and receive communications (e.g., server 1712 to and from client device 1708/1710).

In some embodiments, the payment authorization unit also includes other sub-units to perform the functions of the server described with respect to FIGS. 20A-20D.

It is acceptable to integrate the device shown in FIG. 19 into hardware entities of a variety of networks. For example, the realization device for payment transaction authorization is allowed to be integrated into: server systems including mainframes, PC computers, portable electronic devices, commercial/enterprise servers etc.

FIGS. 20A-20D are a flow chart of a method 2000 of transmitting and receiving data at an acceleration node, in accordance with some embodiments. The method includes receiving (2002) a first connection-establishment request from a first portable electronic device, wherein the first connection-establishment request comprises a unique identification number corresponding to the first portable electronic device and is generated by a client-side of an application running on the first portable electronic device. For example, a smart phone sends a connection-establishment request to the acceleration node, via an instant-messaging application running on the smart phone. In some embodiments, the first portable electronic device is assigned (2004) to the acceleration node by a central node server, in accordance with an acceleration node query request from the first portable electronic device. For example, before sending the connection-establishment request to the acceleration node, the first portable electronic device communicates with the central node server to get an assignment to the acceleration node.

In some embodiments, the central node server and the acceleration node are located (2006) in different countries. For example, the acceleration node server is located in the United States, and the central node server runs an instant messaging application in China. In this example, the first portable electronic device is a smart phone in the United States, sending instant messages to a user of another smart phone.

The method includes, in response to receiving (2008) the first connection-establishment request from the first portable electronic device, connecting (2010) to the first portable electronic device and sending (2012) a first connection-confirmation message to the first portable electronic device.

The method includes receiving (2014) a first set of one or more packet fragments from the first portable electronic device. In some embodiments, the one or more packet fragments (2016) of the first set are each of a predetermined fragment size and each comprise a parent packet identifier to associate multiple packet fragments together. In some embodiments, one packet fragment (2018) of the first set is a complete packet. In some embodiments, the packets or packet fragments correspond to text, audio, video or graphical information.

The method includes, in accordance with a determination (2020) that the first set of one or more packet fragments satisfies one or more buffering criteria, buffering (2022) the first set of one or more packet fragments, and sending (2024) a first packet-receipt confirmation to the first portable electronic device, the first packet-receipt confirmation indicating that the first set of one or more packet fragments has been received by a central node server that runs a server-side of the application, wherein the first portable electronic device is configured to perform another task unrelated to the first set of one or more packet fragments upon receipt of the first packet-receipt confirmation. For example, the first portable electronic device awaits receipt of a packet-receipt confirmation from the acceleration node before allowing the user of the device to perform any other actions on the device. In some embodiments, one buffering criterion is (2026) receipt at the acceleration node of all the packet fragments of a respective packet. In some embodiments, the set of packet fragments are not buffered if the acceleration node is unable to form the packet fragments into whole packets. In some embodiments, if the packet fragments cannot be buffered by the acceleration node, they are directly forwarded to the central node server.

The method includes sending (2028) a second connection-establishment request to the central node server and receiving a second connection-confirmation message from the central node server. The method includes, in response to receiving (2030) the second connection-confirmation message from the central node server, combining (2032) the set of one or more packet fragments into one or more data packets, sending (2034) the combined data packets to the central node server and receiving (2036) a second packet-receipt confirmation from the central node server. In some embodiments, the acceleration node makes more than one attempt to send the combined data packets to the central node server. In some embodiments, if the acceleration node does not receive the second packet-receipt confirmation from the central node server, the acceleration node sends a failure notification to the first portable electronic device. The method further includes, in response to receiving the second packet-receipt confirmation, deleting (2038) the first set of one or more buffered packet fragments from the acceleration node.

In some embodiments, the method includes receiving (2040) a second set of one or more packet fragments from the central node server. For example, another portable electronic device is sending a series of instant messages to a recipient at a second portable electronic device through an instant messaging application. In some embodiments, the method includes, in accordance with a determination (2042) that the second set of one or more packet fragments satisfies one or more buffering criteria, buffering (2044) the second set of one or more packet fragments and sending (2046) a third packet-receipt confirmation to the central node server.

In some embodiments, the method includes identifying (2048) a second portable electronic device from the second set of one or more packet fragments. In some embodiments, the method includes connecting (2050) to the second portable electronic device. In some embodiments, connecting (2050) to the second portable electronic device includes sending (2052) a third connection-establishment request to the second portable electronic device and receiving (2054) a third connection-confirmation message from the second portable electronic device.

In some embodiments, the method includes sending (2056) the second set of one or more packet fragments to the second portable electronic device. In some embodiments, the method includes receiving (2058) a fourth packet-receipt confirmation from the second portable electronic device, and in accordance with a determination (2060) that the second set of one or more packet fragments have been buffered at the acceleration node, deleting (2062) the second set of one or more buffered packet fragments.

While particular embodiments are described above, it will be understood it is not intended to limit the disclosure to these particular embodiments. On the contrary, the disclosure includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the disclosure herein is for the purpose of describing particular embodiments only and is not intended to be limiting of the disclosure. As used in the description of the disclosure and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be executed in hardware, firmware, software or any combination thereof.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

What is claimed is:

1. A method of transmitting and receiving data at an acceleration node having one or more processors and memory for storing programs to be executed by the acceleration node, comprising:
   receiving a first connection-establishment request from a first portable electronic device, wherein the first connection-establishment request comprises a unique identification number corresponding to the first portable electronic device and is generated by a client-side of an application running on the first portable electronic device;
   in response to receiving the first connection-establishment request from the first portable electronic device:
      connecting to the first portable electronic device; and
      sending a first connection-confirmation message to the first portable electronic device;
   receiving a first set of one or more packet fragments from the first portable electronic device;
   in accordance with a determination that the first set of one or more packet fragments satisfies one or more buffering criteria:
      buffering the first set of one or more packet fragments; and
      sending a first packet-receipt confirmation to the first portable electronic device, the first packet-receipt confirmation indicating that the first set of one or more packet fragments has been received by a central node server that runs a server-side of the application, wherein the first portable electronic device is configured to perform another task unrelated to the first set of one or more packet fragments upon receipt of the first packet-receipt confirmation;
   sending a second connection-establishment request to the central node server and receiving a second connection-confirmation message from the central node server;
   in response to receiving the second connection-confirmation message from the central node server:
      combining the set of one or more packet fragments into one or more data packets;
      sending the combined data packets to the central node server; and
      receiving a second packet-receipt confirmation from the central node server; and
   in response to receiving the second packet-receipt confirmation, deleting the first set of one or more buffered packet fragments from the acceleration node.

2. The method of claim 1, further comprising:
   receiving a second set of one or more packet fragments from the central node server;
   in accordance with a determination that the second set of one or more packet fragments satisfies one or more buffering criteria:
      buffering the second set of one or more packet fragments; and
      sending a third packet-receipt confirmation to the central node server;
   identifying a second portable electronic device from the second set of one or more packet fragments;
   connecting to the second portable electronic device;
   sending the second set of one or more packet fragments to the second portable electronic device;
   receiving a fourth packet-receipt confirmation from the second portable electronic device; and in accordance with a determination that the second set of one or more packet fragments have been buffered at the acceleration node:
    deleting the second set of one or more buffered packet fragments.

3. The method of claim 2, wherein connecting to the second portable electronic device comprises:
    sending a third connection-establishment request to the second portable electronic device; and
    receiving a third connection-confirmation message from the second portable electronic device.

4. The method of claim 1, wherein the first portable electronic device is assigned to the acceleration node by the central node server, in accordance with an acceleration node query request from the first portable electronic device.

5. The method of claim 1, wherein the central node server and the acceleration node are located in different countries.

6. The method of claim 1, wherein the one or more packet fragments of the first set are each of a predetermined fragment size and each comprise a parent packet identifier to associate multiple packet fragments together.

7. The method of claim 1, wherein one packet fragment of the first set is a complete packet.

8. The method of claim 1, wherein one buffering criterion is receipt at the acceleration node of all the packet fragments of a respective packet.

9. An acceleration node, comprising:
    one or more processors;
    memory having instructions stored thereon, the instructions, when executed by the one or more processors, cause the processors to perform operations comprising:
        receiving a first connection-establishment request from a first portable electronic device, wherein the first connection-establishment request comprises a unique identification number corresponding to the first portable electronic device and is generated by a client-side of an application running on the first portable electronic device;
        in response to receiving the first connection-establishment request from the first portable electronic device:
            connecting to the first portable electronic device; and
            sending a first connection-confirmation message to the first portable electronic device;
        receiving a first set of one or more packet fragments from the first portable electronic device;
        in accordance with a determination that the first set of one or more packet fragments satisfies one or more buffering criteria:
            buffering the first set of one or more packet fragments; and
            sending a first packet-receipt confirmation to the first portable electronic device, the first packet-receipt confirmation indicating that the first set of one or more packet fragments has been received by a central node server that runs a server-side of the application, wherein the first portable electronic device is configured to perform another task unrelated to the first set of one or more packet fragments upon receipt of the first packet-receipt confirmation;
        sending a second connection-establishment request to the central node server and receiving a second connection-confirmation message from the central node server;
        in response to receiving the second connection-confirmation message from the central node server:
            combining the set of one or more packet fragments into one or more data packets;
            sending the combined data packets to the central node server; and
            receiving a second packet-receipt confirmation from the central node server; and
        in response to receiving the second packet-receipt confirmation, deleting the first set of one or more buffered packet fragments from the acceleration node.

10. The acceleration node of claim 9, wherein the operations further comprise:
    receiving a second set of one or more packet fragments from the central node server;
    in accordance with a determination that the second set of one or more packet fragments satisfies one or more buffering criteria:
        buffering the second set of one or more packet fragments; and
        sending a third packet-receipt confirmation to the central node server;
    identifying a second portable electronic device from the second set of one or more packet fragments;
    connecting to the second portable electronic device;
    sending the second set of one or more packet fragments to the second portable electronic device;
    receiving a fourth packet-receipt confirmation from the second portable electronic device; and
    in accordance with a determination that the second set of one or more packet fragments have been buffered at the acceleration node:
        deleting the second set of one or more buffered packet fragments.

11. The acceleration node of claim 10, wherein connecting to the second portable electronic device comprises:
    sending a third connection-establishment request to the second portable electronic device; and
    receiving a third connection-confirmation message from the second portable electronic device.

12. The acceleration node of claim 9, wherein the first portable electronic device is assigned to the acceleration node by the central node server, in accordance with an acceleration node query request from the first portable electronic device.

13. The acceleration node of claim 9, wherein the central node server and the acceleration node are located in different countries.

14. The acceleration node of claim 9, wherein the one or more packet fragments of the first set are each of a predetermined fragment size and each comprise a parent packet identifier to associate multiple packet fragments together.

15. The acceleration node of claim 9, wherein one packet fragment of the first set is a complete packet.

16. The acceleration node of claim 9, wherein one buffering criterion is receipt at the acceleration node of all the packet fragments of a respective packet.

17. A non-transitory computer readable storage medium storing one or more programs, the one or more programs comprising instructions, which when executed by an acceleration node, cause the server to:
    receive a first connection-establishment request from a first portable electronic device, wherein the first connection-establishment request comprises a unique identification number corresponding to the first portable electronic device and is generated by a client-side of an application running on the first portable electronic device;
    in response to receiving the first connection-establishment request from the first portable electronic device:
        connect to the first portable electronic device; and send a first connection-confirmation message to the first portable electronic device;
receive a first set of one or more packet fragments from the first portable electronic device;
in accordance with a determination that the first set of one or more packet fragments satisfies one or more buffering criteria:
  buffer the first set of one or more packet fragments; and
  send a first packet-receipt confirmation to the first portable electronic device, the first packet-receipt confirmation indicating that the first set of one or more packet fragments has been received by a central node server that runs a server-side of the application, wherein the first portable electronic device is configured to perform another task unrelated to the first set of one or more packet fragments upon receipt of the first packet-receipt confirmation;
send a second connection-establishment request to the central node server and receive a second connection-confirmation message from the central node server;
in response to receiving the second connection-confirmation message from the central node server:
  combine the set of one or more packet fragments into one or more data packets;
  send the combined data packets to the central node server; and
  receive a second packet-receipt confirmation from the central node server; and
in response to receiving the second packet-receipt confirmation, delete the first set of one or more buffered packet fragments from the acceleration node.

18. The non-transitory computer readable storage medium of claim 17, further comprising instructions that cause the server to:

receive a second set of one or more packet fragments from the central node server;
in accordance with a determination that the second set of one or more packet fragments satisfies one or more buffering criteria:
  buffer the second set of one or more packet fragments; and
  send a third packet-receipt confirmation to the central node server;
identify a second portable electronic device from the second set of one or more packet fragments;
connect to the second portable electronic device;
send the second set of one or more packet fragments to the second portable electronic device;
receive a fourth packet-receipt confirmation from the second portable electronic device; and
in accordance with a determination that the second set of one or more packet fragments have been buffered at the acceleration node:
  delete the second set of one or more buffered packet fragments.

19. The non-transitory computer readable storage medium of claim 18, wherein connecting to the second portable electronic device comprises:
  sending a third connection-establishment request to the second portable electronic device; and
  receiving a third connection-confirmation message from the second portable electronic device.

20. The non-transitory computer readable storage medium of claim 17, wherein the first portable electronic device is assigned to the acceleration node by the central node server, in accordance with an acceleration node query request from the first portable electronic device.

* * * * *